United States Patent [19]

Martin et al.

[11] Patent Number: 5,649,410
[45] Date of Patent: Jul. 22, 1997

[54] POST-HYDRATION METHOD AND APPARATUS FOR TRANSPORTING, INSPECTING AND PACKAGING CONTACT LENSES

[75] Inventors: Wallace Anthony Martin, Orange Park, Fla.; Ture Kindt-Larsen, Holte, Denmark; Russell James Edwards, Jacksonville, Fla.; Borge Peter Gundersen, Tikob, Denmark; Darren Scott Keene; John Mark Lepper, both of Jacksonville, Fla.; Niels Jorgen Madsen, Allerod; Thomas Christian Ravn, Helsignor, both of Denmark; Daniel Tsu-Fang Wang, Jacksonville, Fla.; Masao Funo, Saitaka-pref, Japan; William Edward Holley, Ponte Vedra Beach, Fla.; Tomoichi Watanabe, Saitaka-Pref., Japan

[73] Assignee: Johnson & Johnson Vision Products, Inc., Jacksonville, Fla.

[21] Appl. No.: 432,957

[22] Filed: May 1, 1995

Related U.S. Application Data

[63] Continuation-in-part of Ser. No. 258,557, Jun. 10, 1994, Pat. No. 5,578,331.

[51] Int. Cl.⁶ .................................................. B65B 03/04
[52] U.S. Cl. ........................ 53/474; 53/54; 53/239; 53/431; 53/478; 134/901; 264/2.6; 414/225
[58] Field of Search .................. 53/53, 54, 111 RC, 53/239, 402, 431, 445, 474, 478; 134/66, 901; 198/347.4; 206/5.1; 264/1.32, 2.6; 269/21; 294/64.1, 65, 1.2; 356/124, 239; 414/222, 225; 425/445

[56] References Cited

U.S. PATENT DOCUMENTS

| | | | |
|---|---|---|---|
| 2,922,445 | 1/1960 | Osmond et al. | 53/54 X |
| 3,389,811 | 6/1968 | Frank | 53/54 X |
| 3,934,920 | 1/1976 | Rowekamp | 294/65 X |
| 4,079,845 | 3/1978 | Warren | 44/796.3 |
| 4,164,099 | 8/1979 | Grant | 269/21 X |
| 4,223,782 | 9/1980 | Giambalvo | 294/64.1 X |
| 4,401,207 | 8/1983 | Garver | 198/347.4 X |
| 4,411,574 | 10/1983 | Riley | 294/65 X |
| 4,415,076 | 11/1983 | Campbell | 206/5.1 |
| 4,444,424 | 4/1984 | Lebret | 294/65 X |
| 4,520,596 | 6/1985 | Otto et al. | 414/225 X |

(List continued on next page.)

*Primary Examiner*—Daniel Moon

[57] ABSTRACT

The present invention, which relates to post hydration processing of contact lenses and the packages into which the lenses are placed, includes several assemblies which are ideally suited to performing the various steps which are associated with post hydration processing. These several assemblies include: a deionizing water injection assembly which fills the packaging elements prior to the lenses being inserted therein; a lens transfer and insertion assembly which removes contact lenses from hydration pallets, alters their spatial distribution, and deposits them into the packaging elements; a buffering station, which includes segregator and integrator devices, and which provides a location for temporarily holding a group of lens-packaging pallets during interruption of subsequent assemblies; a low vibration lens-package transport and inspection assembly which removes the pallets from a conveyor line, inserts them onto low vibration inspection assembly conveyor line, and inspects the lenses to determine which are optically correct; a deionized water extraction assembly which removes the deionized water from the lens-packaging elements; a first rotating lens-package transfer assembly, which removes the lens-package elements from the pallet and deposits the optically correct ones onto a consolidating conveyor line; a consolidating conveyor line and rotating lens-package transfer assembly, the former consolidating the lenses into regular arrays, and the latter rotating and transporting them to the final station; and a saline solution injector and foil wrapper sealing assembly, which fills the packages with saline solution and then heat seals a foil wrapper to the tops of the packaging elements.

10 Claims, 22 Drawing Sheets

U.S. PATENT DOCUMENTS

| | | | |
|---|---|---|---|
| 4,782,946 | 11/1988 | Pollak | 206/5.1 X |
| 5,080,839 | 1/1992 | Kindt-Larsen | 206/5.1 X |
| 5,094,609 | 3/1992 | Knidt-Larsen | 206/5.1 X |
| 5,099,987 | 3/1992 | Bieri | 220/663 X |
| 5,143,660 | 9/1992 | Hamilton et al. | 206/5.1 X |
| 5,290,134 | 3/1994 | Baba | 294/65 X |
| 5,407,062 | 4/1995 | Shannon et al. | 206/5.1 |
| 5,467,868 | 11/1995 | Abrams et al. | 134/901 X |
| 5,476,111 | 12/1995 | Andersen et al. | 134/901 X |
| 5,488,815 | 2/1996 | Abrams et al. | 53/425 |

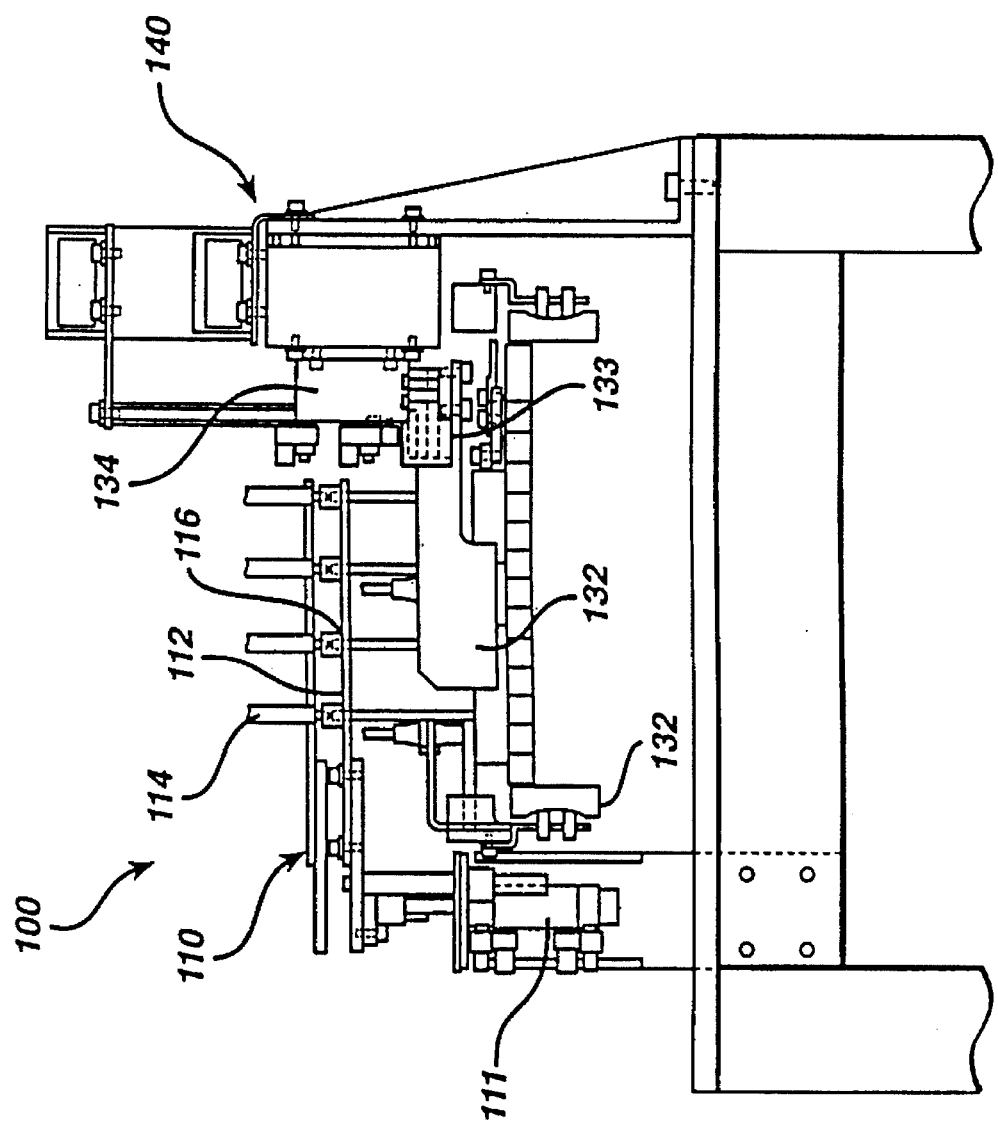

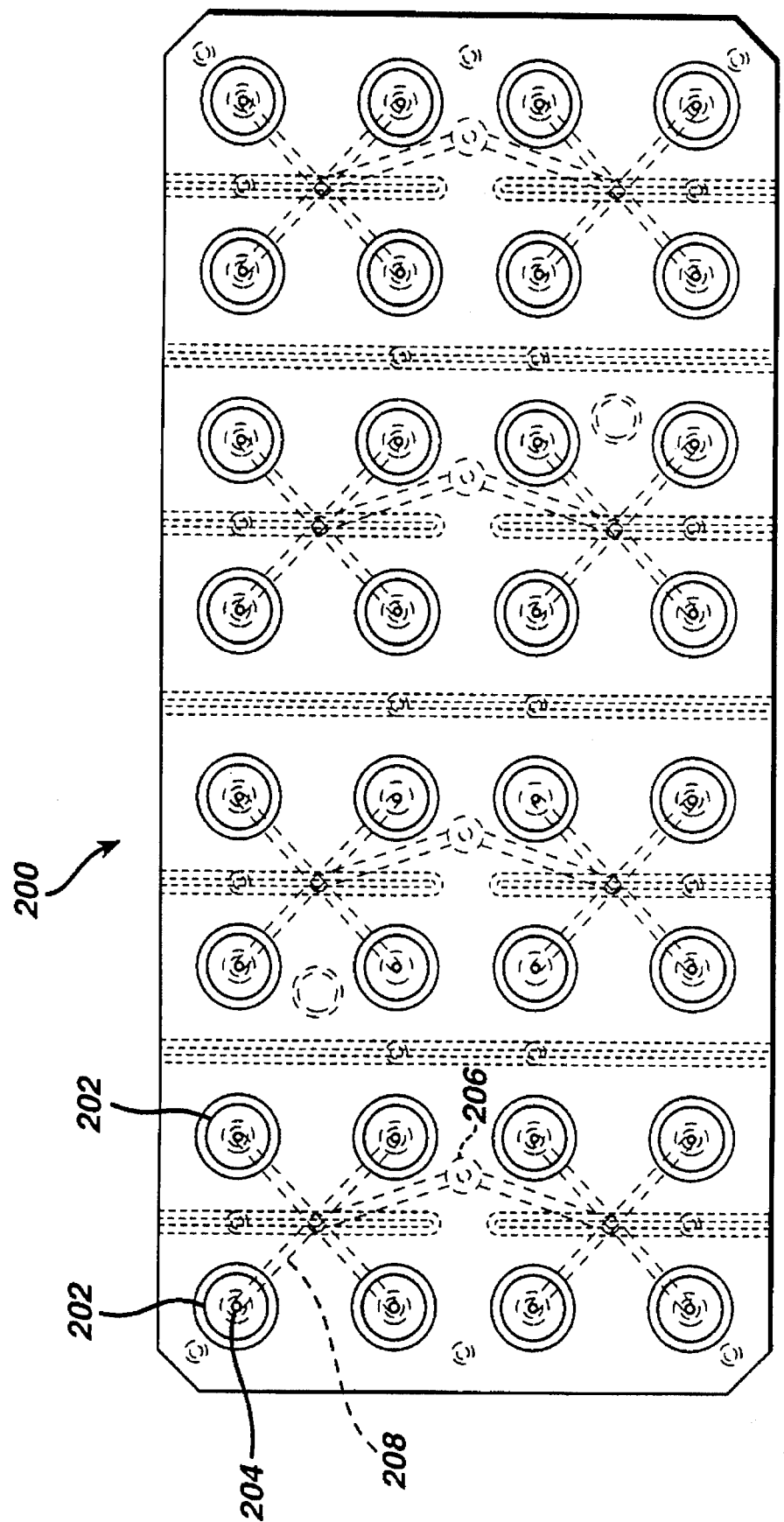

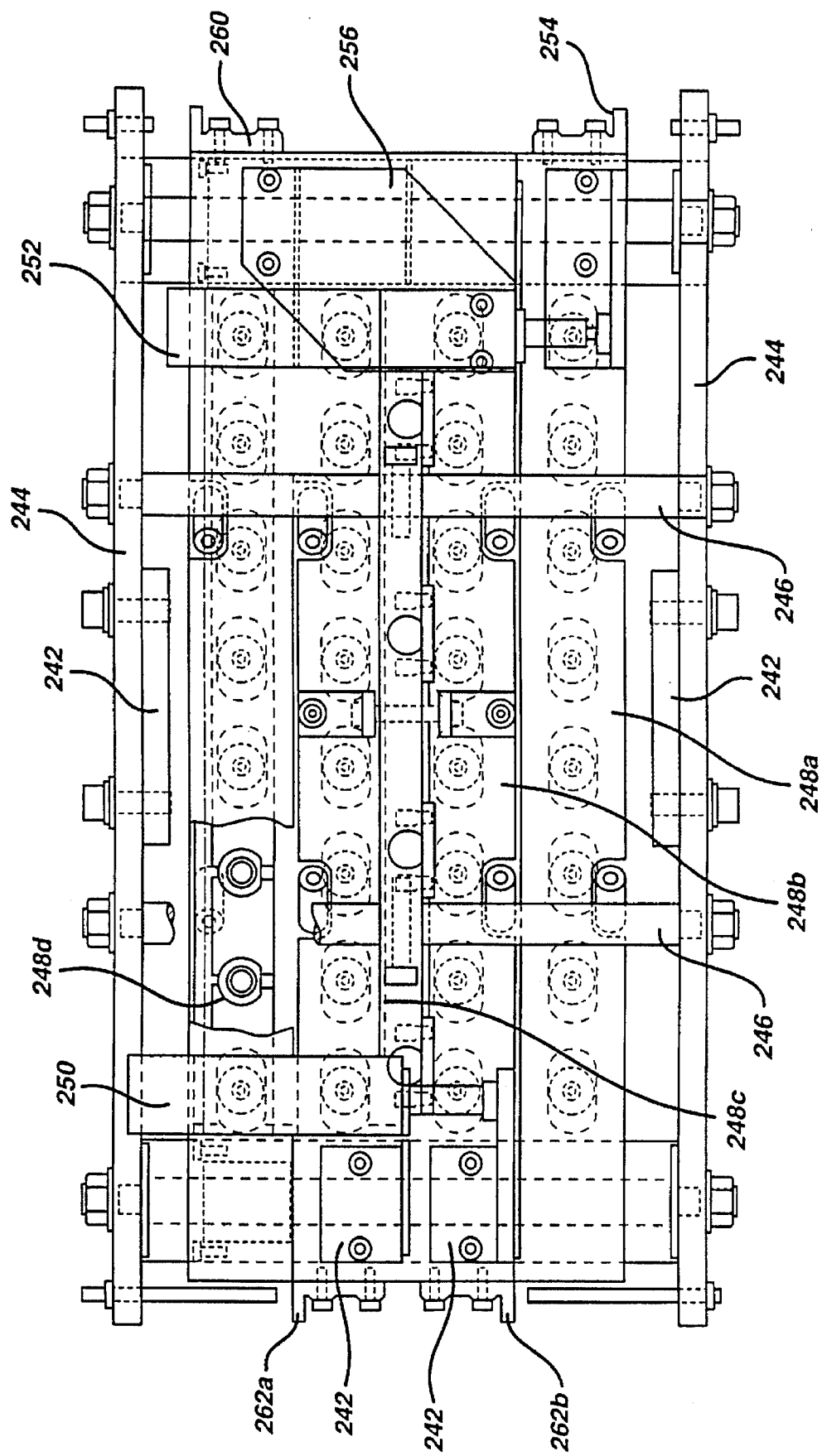

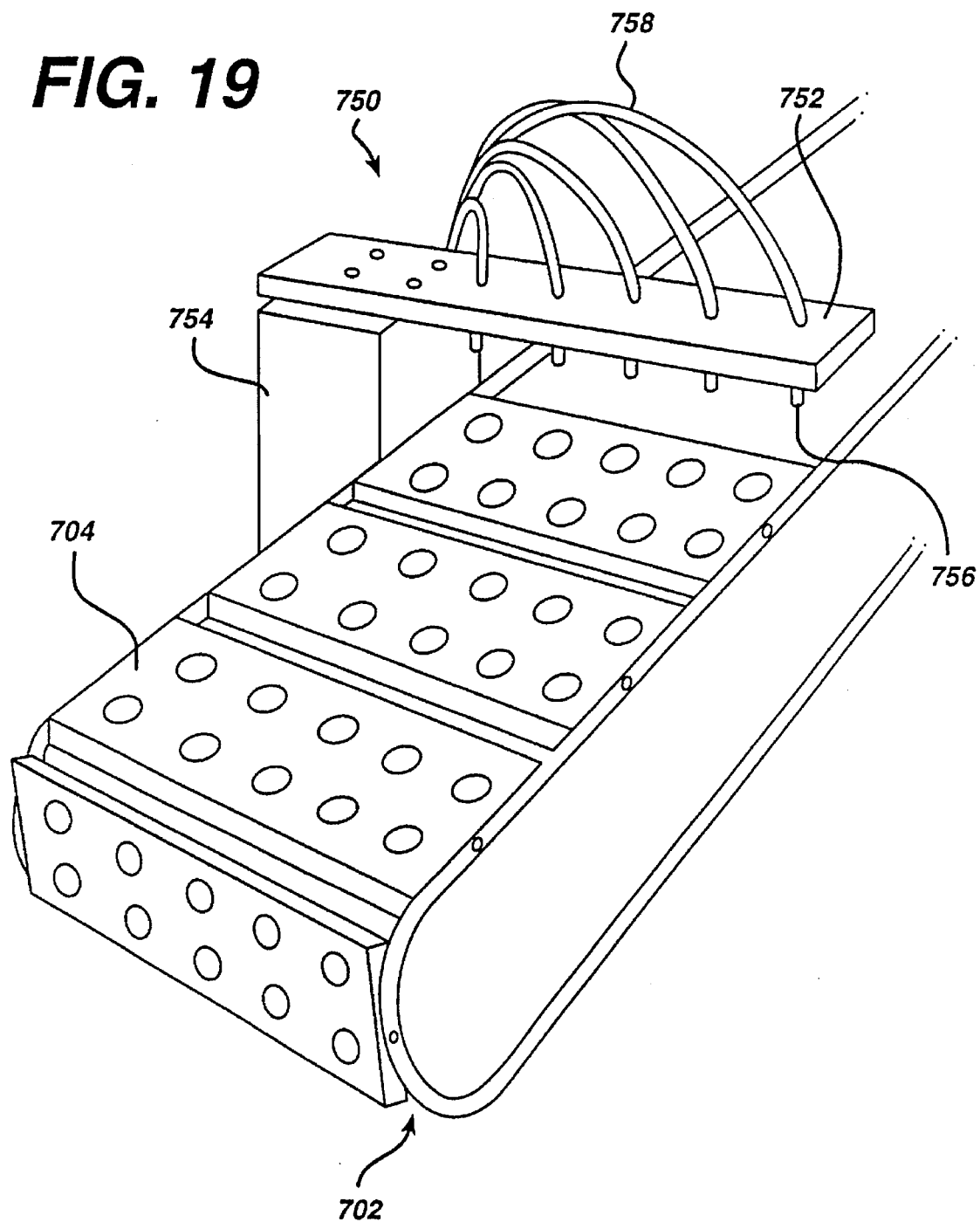

POST-HYDRATION METHOD AND APPARATUS FOR TRANSPORTING, INSPECTING AND PACKAGING CONTACT LENSES

CROSS REFERENCE TO RELATED APPLICATION

The present invention is a continuation-in-part of prior application "Automated Apparatus and Method for Preparing Contact Lenses for Inspection and Packaging", U.S. Ser. No. 08\258,557, filed Jun. 10, 1994, U.S. Pat. No. 5,578,331 which has also been assigned to the assignee of the present invention.

BACKGROUND OF THE INVENTION

1. Field of the Invention

The present invention relates generally to the field of manufacturing contact lenses. More particularly, the present invention relates to an apparatus which removes contact lenses from a first set of pallets, inserts them into corresponding packaging elements on a second set of pallets, and transports the lens-packaging elements through inspection and final package sealing assemblies.

2. Description of the Prior Art

The molding of hydrophilic contact lenses is disclosed in U.S. Pat. No. 4,495,313 to Larsen; U.S. Pat. No. 4,640,489 to Larsen, et al.; U.S. Pat. No. 4,680,336 to Larsen et al.; U.S. Pat. No. 4,889,664 to Larsen et al.; and U.S. Pat. No. 5,039,459 to Larsen et al., all of which are assigned to the assignee of the present invention. sandwiching monomer or monomer mixture between a front curve (lower) mold section and back curve (upper) mold section, carried in a two by four mold array. The monomer is polymerized, thus forming a lens which is then removed from the mold sections and further treated in a hydration bath and packaged for consumer use.

U.S. Pat. Nos. 5,080,839 and 5,094,609 disclose respectively a process for hydrating contact lenses and a chamber for hydrating contacts lenses formed with a monomer or monomer mixtures disclosed in the forgoing patents. The process disclosed in these patents significantly reduce the thruput time by hydrating the lens and releasing the lens from the mold cavity with deionized water and a small amount of surfactant without any salts, so that the time consuming ionic neutralization of the polymer from which the lens blank is made does not occur during the hydration process. When deionized water is used, the final step of the process is to introduce buffered saline solution into the final package with the lens and then seal the lens within the package so that the final lens equilibrium (ionic neutralization, final hydration and final lens dimensioning) is accomplished in the package at room temperature or during sterilization.

U.S. Pat. No. 4,961,820, also assigned to the assignee of the present invention, discloses a final package for a contact lens, wherein the package is formed from a transparent plastic material such as polypropylene and a foil laminate that is heat sealed thereto.

While U.S. Pat. Nos. 5,080,839 and 5,094,609 contemplate that the entire hydration process and transfer to final packaging may take place in a fully automated fashion, and while the chamber and process described in the foregoing patents enabled automated handling of the lens during hydration, suitable automated equipment to transport the lenses at high production rates and maintain low discard rates of manufactured lenses due to delay and dehydration thereof was not readily available or taught by the prior art.

SUMMARY OF THE INVENTION

A manufacturing assembly line may include apparatuses for both the manufacture of a product and of packaging therefor. In addition, apparatuses may be provided which are directed to the insertion of the product into the packaging and/or to the inspection of the product. In addition, recent developments in the inspection of contact lenses produced in accordance with the foregoing methods has enabled automated lens inspection, as taught in U.S. Ser. No. 08\994,564, entitled "Lens Inspection Method and Apparatus", (VTN 0037) (Attorney Docket 9275) assigned to the assignee of the present invention. Further, recent developments in the hydration and automated handling of wet contact lenses, as taught in U.S. Pat. No. 5,476,111, entitled "Automated Method and Apparatus for Hydrating Soft Contact Lenses", also assigned to the assignee in the present invention, has enabled automatic robotic handling of lenses during hydration, and prior to the inspection thereof by the automated lens inspection system.

Automated manufacturing processes often include steps which are particularly sensitive to interruption. For example, with respect to the manufacture of contact lens mold sections, the successful molding of thermoplastic elements having sufficiently correct optical surfaces requires that temperature fluctuations in the molding station remain steady. Other apparatuses in manufacturing lines, however, are subject to frequent interruption; requiring resupplies of materials, substitution of parts, etc. For example, materials for manufacturing packaging materials may be supplied in segmented rolls which, once depleted must be replaced.

The design of a fabrication line, which includes apparatuses of both type, must provide buffer zones in which parts being manufactured continually by one apparatus may be held temporarily as another is interrupted for a short time. It is therefore, a goal of those in the art to provide one or more accumulators or buffer zones for use in fabrication lines to even out such fluctuations. Again, with specific respect to the manufacture of contact lenses, recent developments are disclosed in U.S. Pat. No. 5,578,331, entitled "Automated Apparatus and Method for Preparing Contact Lenses for Inspection and Packaging", also assigned to the assignee of the present invention, in which a buffer station is incorporated into the production line, for the purposes of permitting continuous function of some apparatuses, while other apparatuses are interrupted. The specification of U.S. Pat. No. 5,578,331 is herein incorporated by reference.

The present invention is directed to the portion of the contact lens assembly line in which: a pallet of packaging elements are filled with a quantity of deionized water; a set of contact lenses, which have been molded, hydrated, and washed, are removed from a pallet and inserted into their respective packaging elements; the combined set of packaging elements and respective lenses are transported to a buffering station; the set of elements are transferred to a low vibration conveyor line; the contact lenses are inspected for flaws; the deionized water is removed from the packages; the combined elements are removed from their pallets, the packages containing flawed lenses are deposited on a conveyor line which deposits the elements in a collection bin, and the packages containing correct lenses are deposited on a good line; the lenses on the good line are consolidated into a regular array and transported onto a pallet; and a quantity of saline solution is introduced into the packages and a foil cover is heat sealed to the package.

More specifically, with respect to the assemblies which carry out the processes introduced above, and which comprise the apparatuses of the present invention, the deionized water injector assembly is a device for injecting a quantity of deionized water into packaging elements on a pallet. This deionized water injector assembly is mounted above a conveyor line along which pallets of regularly arrayed packaging elements are transported from a remote fabrication location to the second location where they receive contact lenses. The spatial distribution of the regular array of the packaging elements is specifically established to match the optical array in the inspection station.

The lens extraction and insertion assembly of the present invention is a lens transfer device which lifts lenses from hydration pallets at a first location and deposits them, along with an additional dose of deionized water, into the packaging elements at the second location. In addition to transferring the lenses, the device also alters the spatial distribution of the lenses from their orientation in the hydration pallets to an orientation which corresponds to the packaging elements (and the lens inspection station).

More specifically with respect to the means by which the lenses are extracted from the hydration pallets and transferred to the packaging elements, the hydration pallets comprise a set of concave recessions in which the lenses are disposed, along with a quantity of deionized water. The bottom of the recessions comprise at least one hole through which a fluid may be ejected, therein lifting the wet lenses out of the recessions. The lens transfer assembly comprises a set of elongate finger elements which extend downward, each finger element having a convex lens transfer surface onto which the lifted lens may be secured via surface tension. The convex lens transfer surface of the finger is further designed with an annular raised skirt around the tip which prevents the lens from sliding out of the desired position during transfer. The lenses which have been transferred to the convex lens transfer surfaces on the fingers of the lens transfer device, may have small bubbles of air on their exposed surface. The small bubbles, if permitted to remain on the surface of the lens through the inspection process may interfere with proper inspection, and cause the lens to be improperly determined to be bad, and discarded unnecessarily. At least one jet of air is blown onto each lens for the purposes of removing the air bubbles from this exposed surface.

The fingers of the lens transfer assembly are set out in rows on parallel beams which are slidably mounted on guide rails. The parallel beams are coupled together via piston/cylinder elements, and are drawn together once the lenses have been extracted and the bubble blow off step have been carried out. This action alters the relative separation of the lenses with respect to one axis, so that the lenses will be arrayed to match the array provided by a lens inspection pallet.

The lens transfer assembly then is linearly translated to the second location, into position above the inspection pallet. The fingers of the lens transfer assembly are further designed with an interior conduit, extending from a small orifice in the lens transfer surface of the finger to a reservoir of deionized water, through which deionized water may be selectively ejected. With the fingers, and the lenses secured thereto, in position above the packages, a small jet of deionized water is ejected through each orifice, therein decoupling the contact lenses from the lens transfer surfaces and depositing them into the packages that were loaded in the inspection carrier.

The pallet and the package elements which now contain contact lenses are then transported via a conveyor belt to a buffering station. More specifically, the pallets are transported to a segregating apparatus, which directs alternating pallets onto parallel conveyor lines. The conveyor lines extend a sufficient distance, from their first ends to their remote ends, that a significant temporal delay may be accommodated, and the lenses stored without requiring stopping the molding line which requires a long start up time.

The buffering station taught in U.S. Pat. No. 5,578,331, entitled "Automated Apparatus and Method for Preparing Contact Lenses for Inspection and Packaging", is positioned after the inspection station, at a point in the manufacturing line where the packages containing the lenses have been drained of deionized water. Deprived of a liquid environment, the lenses are permitted to stand for no longer than 15 minutes before rejection thereof. Moving the buffering station to a point in the line at which the lenses remain bathed in deionized water permits indefinite holding without damaging the lenses.

At the remote end of the buffering station, at the ends of the parallel conveyor lines along which the pallets may be stored, there is an integrator assembly which integrates alternate pallets from the two conveyor lines to continue toward the next station. More specifically, the parallel conveyor lines of the buffering station have, mounted to their end (the end toward which the pallets are transported), a device which selectively merges the two streams of pallets so that they may pass onto the next conveyor.

In the embodiment of the buffering station which is described more particularly below with respect to the Figures, the conveyor lines which transport the pallets to the buffering station and which extend after the buffering station are co-linear and immediately adjacent to a first one of the two parallel conveyor lines. The segregator device, therefore, first allows a single pallet to advance onto the first buffer line, and then transfers the next pallet to the parallel second buffer line. In a similar, but inverse fashion, the integrator device operates by permitting one pallet from the first buffer line to pass, then transports a pallet from the second buffer line to the conveyor line which continues beyond the buffering station so that it may follow, and then begins anew by allowing the next pallet from the first buffer line to pass.

In alternative variations of this apparatus, the segregator and integrator devices continually or selectively divide and consolidate the stream of pallets along the two buffer lines. In the first variation, the stream of pallets is divided by the segregator and consolidated by the integrator at all times during the operation of the manufacturing line. In the alternate variation, the segregator and integrator are engaged only under circumstances when the subsequent stations have been interrupted. The segregator of this alternative variation would operate only during interrupted times; the integrator would function past the resumption of the subsequent assemblies until there are no more pallets on the second buffer line. It is understood that there are a variety of alternative buffering algorithms which the segregator and integrator devices may utilize for separating and bringing together the pallets, all of which are equivalent in function and exist within the scope of this invention.

The stream of pallets which continue from the buffering station are transported to a pickup location. At this location the pallets are lifted off the conveyor line by a low vibration pallet transfer assembly and placed on a low vibration conveyor. The low vibration conveyor transports the pallets through the inspection station wherein a determination is made of the optical properties of the hydrated and packaged lenses. It is understood that the proper inspection of the lenses may not occur if the perceived optical properties of the lenses are distorted by air bubbles which have adhered to the surface of the lenses. Waves and disturbances within the deionized water in the packages have a similar distortion effect, causing false determinations of defects. The low vibration conveyor line, therefore, provides a means for minimizing the distortions resulting from water disturbances.

It is understood, however, that in order to maintain the same rate of product flow through the system, the reduction in speed of the stream of pallets along the low vibration conveyor line must be compensated by a corresponding increase in the density of the pallets moving therealong. The low vibration pallet transfer assembly, therefore, places successive pallets adjacent to one another on the low vibration line, such that the spacing between the pallets is substantially reduced from the previous conveyor lines.

Determination of the optical correctness of each lens in each pallet is stored in the memory of a controller/processor so that subsequently a means for separating the good lenses from the bad may be utilized. First, however, the pallets, which contain packages filled with deionized water are transported to a water extraction assembly. Only after the optical correctness of the lenses has been determined may the proper saline solution be introduced into the package. The delay in introducing the saline solution until after the lenses have been inspected permits the line to proceed much more quickly, as, as stated above, the optical and physical characteristics of the lens requires several hours in the saline solution to equilibrate. It is understood that this equilibration is advantageously carried out in the sealed packages, once the lenses have been removed from the manufacturing line.

In the inspection station, a light beam or pulse is directed from sources onto the lens-packages, received by a vertical lens unit, and directed and focused on a screen to produce an image of the lens. The image is converted to an electrical information signal which is processed to determine if the lens is acceptable for consumer use. The lens inspection results are stored in the programmable logic controller which coordinates subsequent consolidation and transfer assemblies.

After inspection, the pallets are lifted into a water extraction assembly which is mounted above the conveyor line. A device for deionized water extraction from packages containing contact lenses is taught in U.S. Ser. No. 08/999,234 now abandoned entitled "Solution Removal Nozzle", which is also assigned to the assignee of the present invention.

Once the water has been removed, the packages are transported along the conveyor line to a lens-package pickup point. At this location the packages are lifted by a lens-package transfer assembly from the pallets and moved to alternative conveyor lines. More particularly, there are alternative variations of the lens-package transference assembly; a first in which the lens-package elements are all removed from the pallets, and a second in which only those packages which contain a correct lens are removed. It is understood that the first variation transports the packages over to a reject conveyor line, and pauses during transport to deposit any incorrectly formed lenses and the packages in which they are disposed. The assembly then transports the remaining correctly formed lenses and packages to the good conveyor line. In the second variation, the lens-package transfer assembly removes only the properly formed lenses and packages from the pallets and transports them to the good conveyor line.

Any rejected lenses are then removed from the inspection pallets in a subsequent collection procedure. In either variation, it is understood that the determinations made by the inspection assembly, which were stored in memory by a processor/controller are herein acted upon by the lens-package transfer assembly.

More specifically, with respect to the lens-package transfer assembly, a set of bellowed fingers, extending downward from a vacuum manifold are first positioned directly above the packages on a pallet. By descending from a position above, bringing the tips of the fingers into contact with the packages, and drawing a vacuum in an interior open volume, the packages are secured to the lens-package transfer assembly. As stated above, the processor/controller may either control the selective pickup of the optically correct lens-packages, or the assembly may pick up all of the lens-packages. In either case, the desired lens-packages are transported to the good conveyor line, where the vacuum is released and the lens packages are dropped from the tips of the fingers.

In either case, the array of lens-packages which are ultimately deposited onto the good conveyor line are not necessarily in a regular array, as they were on the pallet (having had the incorrectly formed lens-package elements removed). The good line, therefore, also carries out a consolidating function, whereby the lens-packages are brought back together into a regular distribution. More specifically, the conveyor line carries the articles into separate corral structures. A first lens-package is conveyed between converging guide rails (which align the lens-package along one axis of motion), and into a corral. The first lens-package in line is stopped by a gate at the distal end. The next lens-package follows the lead one and is stopped by coming in contact with the first. Once a predetermined number of lens-packages have entered the corral, and a regular array of lens-packages has been established, the lens-packages are removed from the conveyor line and deposited onto a final packaging pallet.

More particularly, the lens-package elements are removed from the corral, into which they have been directed by a conveyor line, by a rotating lens-package transfer assembly. This assembly comprises an array of bellowed fingers, similar in most respects to those of the lens-package transfer assembly, which lift the array of lens-package elements and places them onto pallets. The assembly further includes a rotational motion which rotates the array of elements to match the orientation of the pallets used for primary packaging.

Once the lens-packaging elements have been deposited onto these pallets, they enter into a saline dosing and sealing assembly. More specifically, the pallets are incrementally translated into position beneath a saline solution deposition unit. This unit comprises a row of fluid dispensers which fill the packages with saline solution. As the pallets are incrementally registered beneath the fluid dispensers, a buffered saline solution is injected into each of the packages and each of the lenses begins its equilibration process, matching the tonicity of a human eye (which has an equivalent salinity).

Once the packages have been filled with saline, the pallets continue forward and are sealed with a foil wrapper. More particularly, with respect to the device which applies and seals the foil wrapper to the package, an elongate section of foil wrapper material is advanced through a printer (for printing information pertaining to the particular lens specifications). The foil is then cut into sections which are sized to fit across the tops of an array of packaging elements.

The foil sections and the lens-package assemblies are advanced into alignment with one another. A vacuum gripper head grasps a foil section and descends to the package elements, placing the section in contact therewith. Once the foil wrapper is in position, a sealing mechanism is brought into contact with the packages and heat seals the foil to the package in a single high temperature short cycle sealing operation. The sealed packages are then advanced beyond the sealing assembly where they may be stored during equilibration, and ultimately packaged for distribution.

BRIEF DESCRIPTION OF THE DRAWINGS

The advantages and assemblies of the present invention set forth in the foregoing summary of an automated apparatus for combining, inspecting and sealing contact lenses and packaging elements may be more readily understood by one skilled in the art with reference being had to the following detailed description of the preferred embodiments, taken in conjunction with the accompanying drawings, wherein like elements are designated by identical reference numerals throughout the several views, and in which:

FIGS. 3a and 3b are elevation views, side and front views respectively, of an apparatus which fills packaging elements on a pallet with a quantity of degassed deionized water.

FIG. 4 is a top view of the hydration pallet in which the hydrated and washed lenses are presented at the first location.

FIGS. 5a, 5b, and 5c are side, top, and perspective views, respectively, of the lens transfer and insertion assembly which removes the molded contact lenses from the hydration pallet, alters their relative spacing, and places the contact lenses in the packaging elements.

FIG. 19 is a perspective view of the saline solution injecting subassembly.

DETAILED DESCRIPTION OF THE PREFERRED EMBODIMENTS

The present invention was designed for and is particularly adapted for use in the post hydration processing section of an automated contact lens production facility. Contact lenses molded in an automated production line, such as that described in copending application U.S. Ser. No. 08\258, 654, entitled "Consolidated Contact Lens Molding"; hydrated in a hydration system as described in U.S. Pat. No. 5,476,111 entitled "Automated Method and Apparatus for Hydrating Soft Contact Lenses"; and automatically inspected as described in U.S. Ser. No. 08\994,564 now abandoned, entitled "Lens Inspection Method and Apparatus" are particularly benefitted by the present invention.

The present invention shall be herein described with respect to its specific assemblies and apparatuses, and to the Figures illustrating these features. More specifically, the present invention shall be described, with reference to the following several assemblies:

First, the deionizing water injection assembly which fills the packaging elements prior to the lenses being inserted therein;

Second, the lens transfer and insertion assembly which receives the lenses from hydration pallets, alters their spatial distribution, and injects them into the packaging elements;

Third, the buffering station, and the segregator and integrator devices included therein, which provide a buffering region for temporarily holding a group of lens-packaging pallets during interruption of subsequent assemblies;

Fourth, the low vibration lens-package transport, inspection, and water extraction assemblies which removes the inspection pallets from a conveyor line and inserts them onto the low vibration inspection assembly conveyor line, determines which lens-packages are optically correct, and then removes the deionized water from the packages;

Fifth, the lens-package transfer assembly, which removes the lens-package elements from the pallet and deposits those lens-packages which were determined to be optically correct onto a good conveyor line;

Sixth, the good conveyor line and rotating lens-package transfer assembly, which conveyor line consolidates the optically correct lens-package elements into regular arrays, and the lens-package transfer assembly extracts the arrays, rotates the elements in the horizontal plane, and transports them to another line of pallets; and Seventh, the saline solution injector and foil sealing assemblies, which introduce the appropriate saline solution into the lens-packaging elements and heat seals a foil label onto the top of the packaging element for shipping and identification.

THE DEIONIZING WATER INJECTION ASSEMBLY

Figure 1:
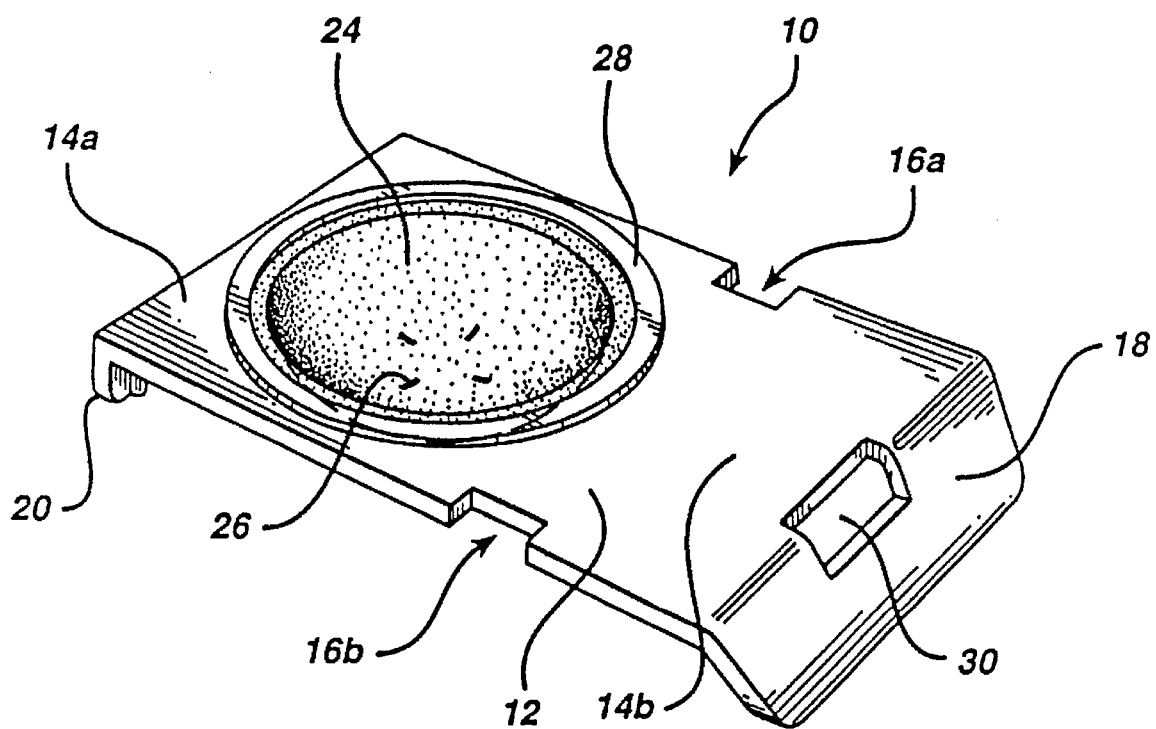
FIG. 1 is a perspective view of a packaging element in which a contact lens may be inserted, and which serves as both a receptacle for the lens during inspection, and a portion of the primary contact lens package.

Referring now to FIG. 1, a suitable packaging element 10 is illustrated in a perspective view. This packaging element is more fully described in copending application U.S. Ser. No. 995,607 now abandoned, the disclosure of which is incorporated here by reference thereto. The packaging element 10 may be formed by injection molding or be thermally formed of plastic sheet material, such as polypropylene. The packaging element 10 includes an essentially rectangularly shaped platform portion 12, which may be visually divided into laterally distinct portions 14a and 14b by registration notches 16a and 16b which are formed in opposing sides of the platform portion. The first portion 14a defines a concave recession 24 which is particularly well suited for receiving therein and transporting a contact lens and fluid. The second portion 14b is generally flat, providing an ideal location for contact with a vacuum lifting means in that it provides a stable surface to seat against.

The package carrier is further defined by a wall portion 18 which descends at an angle, outwardly and downwardly from the platform portion 12 at one end thereof, forming an angled flange member. Descending downwardly from the corners platform portion 12, at the opposing ends thereof, are a pair of registration flanges 20 and 22, only one of which is visible in the view shown in FIG. 1. The registration flanges 20 and 22 are used, in conjunction with the angled flange 18 and registration notches 16a and 16b, to align the packaging element 10 during robotic handling. In particular, the notches 16a and 16b are provided on either side of the platform 12 so that they may cooperate with registration pins on various carrier pallets. Flange structures 18, 20, and 22 mate with the topological structure of pallets onto which the packaging elements are disposed, therein providing additional securing means for holding the element on the pallet.

As stated above, the first portion 14a of the platform includes a concave recession 24 which is of an essentially semi-spherical configuration, generally in conformance with a curvilinear shape of a contact lens (not shown). The contact lenses are therefore, adapted to be stored in the recession 24, in a sealed condition while immersed in a suitable sterile aqueous solution, in a manner similar to that described in U.S. Pat. No. 4,691,820 to Martinez; which is assigned to the assignee of the present invention, the disclosure of which being incorporated herein by reference thereto. The perpendicular extent of the wall portion 18 which descends outwardly and downwardly from the platform member 12 is equivalent to the height or depth of recession 24 therein providing self alignment of the packaging element.

The concave recession 24 also includes a plurality of small gripping marks 26 which are used to assist in holding a contact lens in the centered position in the recession 24 during the removal of deionized water at the deionized water extraction assembly which will be more fully described, with reference to the appertaining Figures hereinafter.

The outer edge of the recession 24 includes a raised annular rim 28 which is provided for enhancing the efficacy of the heat sealing of the foil label in the foil sealing assembly which hermetically seals the contact lenses and packaging elements for commercial distribution. A cut-out 30 is used to facilitate gripping the foil wrapper when it is removed by a consumer to access and use the lens contained therein.

Figure 2:
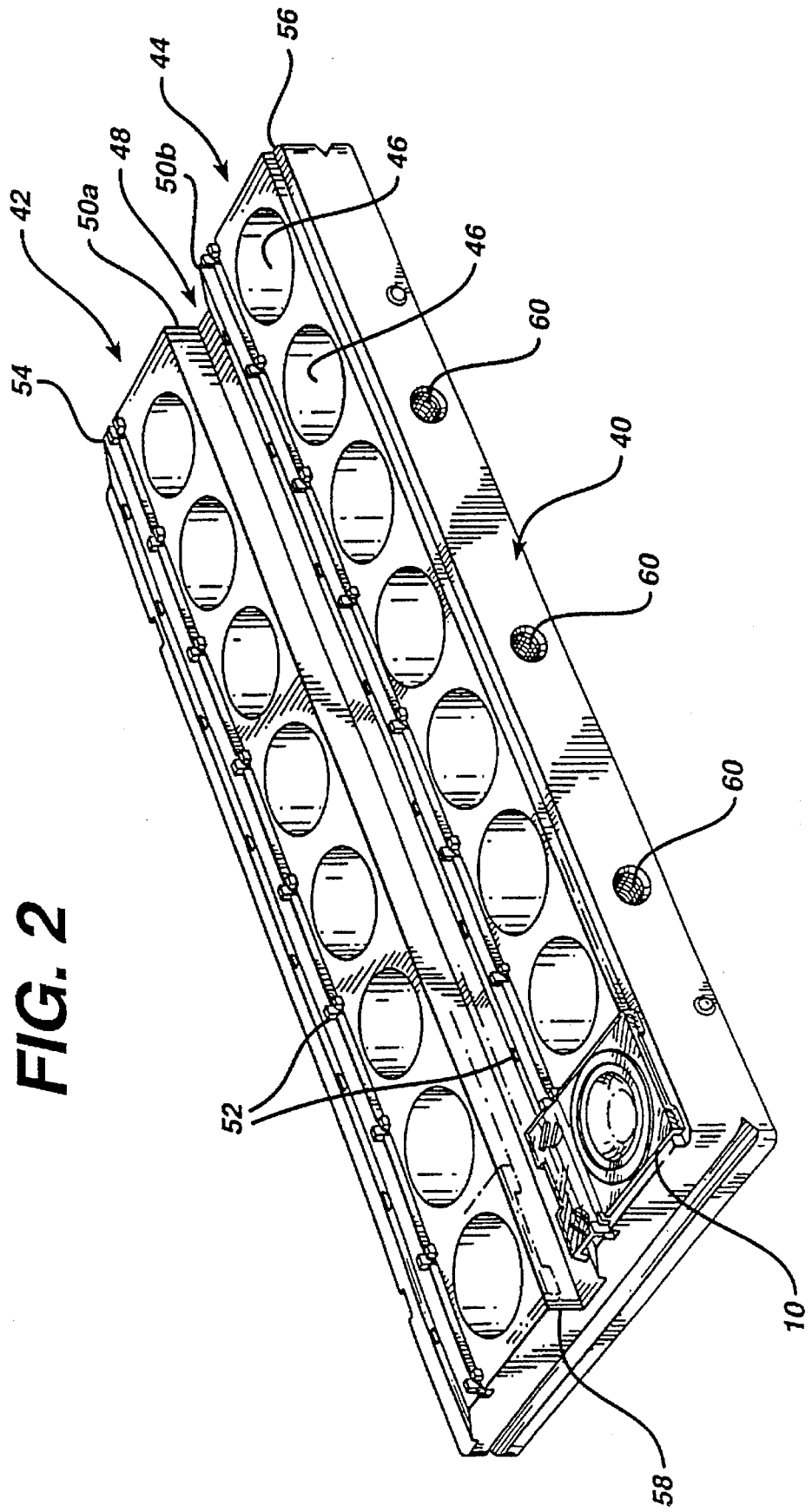
FIG. 2 is a perspective view of an inspection pallet used to transport a plurality of the packaging elements illustrated in FIG. 1 through several assemblies and stations of the present invention.

Referring now to FIG. 2, an inspection pallet on which the packaging elements are transported to the deionized water injection assembly, through the lens transfer assembly, the lens inspection assembly, and the deionized water extraction assembly, to the lens-package transfer assembly, is shown in a perspective view. Pallet 40 includes a first and second parallel rows 42,44 of cavities 46 which are shaped to receive the underside of the recession 24 of the packaging element 10. The parallel rows 42,44 of cavities are separated by a channel 48 which is defined by two walls 50a,50b. The wall corresponding to row 44 descends downwardly and outwardly, the angulation of the slant being specifically set to receive flatly thereon, the descending wall portion 18 of each packaging element 10 disposed on row 44. The outer edge 54 of row 42 is similarly slanted to receive thereon the wall portions 18 of the packaging elements 10 disposed on row 44.

The pallet is further provided with a pair of elongated notches 56,58 for receiving the registration flanges 20,22 of the packaging element. The elongated notches 56,58 further provide a positive grip surface for transferring means that lift, rotate, and transport the pallet.

In addition, the pallet 40 includes registration pins 52 which engage the packaging elements at the lateral edges. These registration pins 52 engage the registration notches 16a,16b of the packaging elements 10 to provide additional accuracy in their registration, specifically with respect to the longitudinal axis of the pallet. The combination of slanted walls 50b and 54, grooves 56 and 58, and the registration pins 52, which each couple with corresponding features of the packaging elements, provide particularly effective means to ensure against rotational skewing.

The inspection pallet 10 is further provided with three registration openings 60, on either side of the pallet 40, which are used by means associated with assemblies of the present invention to transport, and lock the pallet in place, during operation thereof.

As suggested by FIG. 2, the packaging elements 10 are fabricated in sets of sixteen, and are disposed on pallets 40 in predetermined arrays, typically 2×8. The pallets and packages are transported, via a conveyor line, to the deionized water injection assembly in sets of two, oriented to define therebetween an array which is 4×8.

Figure 3A:
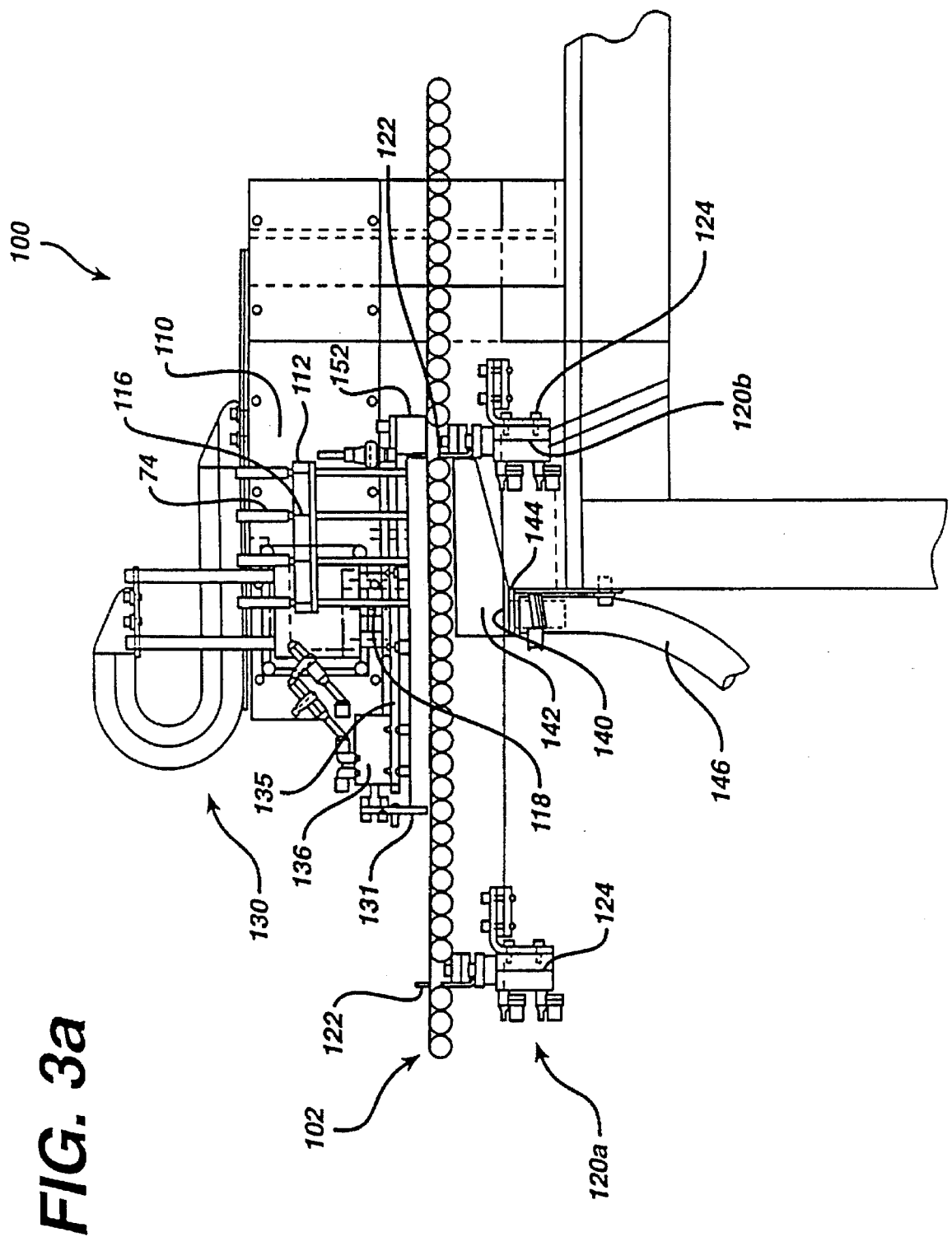

Referring now to FIGS. 3a and 3b, the deionized water injection assembly 100 is shown in a front side view and a lateral side view. This assembly 100 comprises four separate elements: a water dispensing head 110; a set of coordinated vertically oriented stops 120a,b; a pallet positioning device 130; and a water overflow drain unit 140. The water dispensing head 110 translates up and down with respect to a conveyor line 102 and to the pallets 40 thereon. The coordinated vertically oriented stops 120a,b are utilized to stop the advancing pallets 40, and feed one pair of pallets per cycle. The pallet positioning device 130 receives the pair of advancing pallets 40, advances itself and the pallets horizontally to a first water dispensing location, then to a second dispensing location. Once the packages have been filled, after the second location, the pallet positioning device 130 translates vertically which permits the pallets 40 continue to advance along the conveyor 102. The positioning device 130 reciprocates back into position to receive a next set of advancing pallets 40. The water overflow drain unit 140 is positioned beneath the conveyor line, vertically aligned with water dispensing head 130, for catching waste water from the dispenser.

As illustrated in FIG. 3a, the set of coordinated vertically oriented stops 120a,b advancing pallets 40, prior to dosing. Each of the stops 120a,b includes a vertically aligned plate 122 having one of its facial planes perpendicular to the axis of motion of the conveyor line 102. The plate 122 is coupled to a piston/cylinder 124, the selective vertical actuation of which advances the plate 122 into the stream of pallets 40 advancing along the conveyor line 102.

As illustrated in FIGS. 3a and 3b the deionized water dispensing head 110 includes a horizontally disposed reciprocating support plate 112. The support plate 112 has sixteen holes 116 arrayed in a 4×4 matrix. The top of the plate 112 receives a set of sixteen flexible hoses 114, for example tygon tubing or other fluid conduit, for delivering deionized water to a set of sixteen narrow and elongate teflon tubes 118 which extend downwardly from the bottom of the plate 112 and are particularly well suited to delivering precise doses of deionized water therethrough. Teflon is a particularly desirable material for such a use as water generally does not adhere to teflon surfaces in large droplets which may fall therefrom at inappropriate times in the deposition cycle.

The plate 112 is coupled, at a lateral edge, to a piston/cylinder 111, which may be actuated to raise and lower the head 110 (and the teflon tubes 118) in accordance with a predetermined deionized water deposition cycle which is more fully described hereinbelow.

Beneath the conveyor line, vertically aligned with water dispensing head 130, is a water drain unit 140 which is so disposed to catch any excess water which may emanate from the dispenser during purge cycle or cycle misfeeds. The water drain unit comprises a basin 142 having a sloped base, therein forming a funnel-like shape, directing water therein toward a hole 144 in the base. The hole 144 is coupled to a drainage tube 146 which carries the drainage water away from the assembly to a remote location.

The fourth element of the deionized water injection assembly 100 comprises a pallet positioning device 130. This element receives a pair of advancing pallets 40 and first holds them in position beneath the deposition head 110 in a first position so that the first sixteen recesses 24 of the packaging elements may be filled with deionized water. Once the first sixteen recesses 24 have been filled, the pallet positioning device 130 translates horizontally to a second position, thereby repositioning the pallets 40 at a second position beneath the deposition head 110. At this position the second sixteen recesses 40 of the pair of pallets 40 receive a quantity of deionized water. Once the second step of water deposition has taken place, the registration device release the pallets, rises to allow the pallets to advance beneath it, and reciprocates back to the pallet receiving location (the first location).

More specifically with respect to the elements of the pallet positioning device 130, the positioning device comprises a pair of spaced apart arms 131,132 which extend laterally across the conveyor line 102, and which are ideally spaced for receiving and holding pairs of pallets 40 which advance down the conveyor line 102. The arms 131,132 are coupled at their lateral ends 133 to vertically oriented piston/cylinder 134 which raises and lowers the arms 132 in accordance with the timing of the deposition cycle.

In addition to the vertically oriented piston/cylinder 134, the arms 131,132 are coupled together via an elongate spar member 135 and a horizontally disposed piston/cylinder 136. Actuation of the piston/cylinder 136 causes the arms 131,132 to move relative to one another. Specifically, arm 131, which is positioned in front of the deposition head, up stream from the deposition head with respect to the flow of the conveyor line 102, remains stationary as the other arm 132 is directed farther downstream from the deposition head 110, therein moving the pair of pallets 40, into the second deposition position.

In operation the entire assembly functions in accordance with a predetermined timing schedule, beginning with the advance of a pair of pallets 40 along the conveyor line 102, toward the assembly. Once a pair of pallets 40 have passed the first of the coordinated vertical stops 120a, plates 122 are raised, so that additional pallets 40 may be restrained from continuing into the water dosing location.

The two pallets 40 continue to advance until they reach the second of the coordinated vertical stops 120b, at which point the pallet positioning device 130 descends into position holding the pallet in the first deposition position. Deionized water is then injected via the teflon tubes 118 into the first sixteen recesses 24 of the pallets. Once the water has been injected, vertical stop 120b is retracted and the horizontally oriented piston/cylinder 136 of the positioning device 130 is actuated, thereby advancing the pallets 40 to the second deposition position. Once the second set of sixteen recesses 24 have been filled with deionized water, the arms 131,132 are raised by vertically oriented piston/cylinder 134, and the horizontally oriented piston/cylinder 136 is retracted.

Once the first pair of pallets 40 have advanced past the assembly 100, vertical stop 120a is lowered to permit the next pair of pallets through the dispensing station, and the second set of vertical stops 120b are raised. After the second pair of pallets have advanced, the vertical stops 120b are raised to stop the following pallets 40 from entering, and the cycle repeats.

Once the packaging elements 10 have each received a quantity of deionized water, the packaging elements and pallets are transferred along the conveyor line to a lens loading location where each recess 24 receives a contact lens by a loading assembly described hereinbelow.

THE LENS TRANSFER AND INSERTION ASSEMBLY

Referring now to FIG. 4, a contact lens hydration pallet 200 is shown in a top view wherein phantom lines correspond to internal structures of the hydration pallet. The hydration pallet 200 comprises 32 semi-spherical recesses 202 in which contact lenses are transported through a series of extraction stations, which are described more fully U.S. Pat. No. 5,476,111, entitled "Automated Method and Apparatus for Hydrating Soft Contact Lenses", also assigned to the assignee of the present invention.

The hydration pallet 200 has a plurality of conduits 206 which extend upwardly from the top surface of the pallet. These conduits 206 are coupled, via internal branch conduits 208, to small holes 204, one of which is disposed at the bottom of each recess 202, at the bottom thereof. The holes 204 are thereby coupled in gas and/or fluid flow communication with an external supply, whereby a fluid or gas may be selectively introduced between the surface of the recess 202 and a lens disposed therein. The selective introduction of this gas or fluid, via the hole 204, is used to propel the lenses upward so that they may each adhere to corresponding convex lens attachment surface of the finger elements of the lens transfer assembly as described hereinbelow.

Figure 5A:
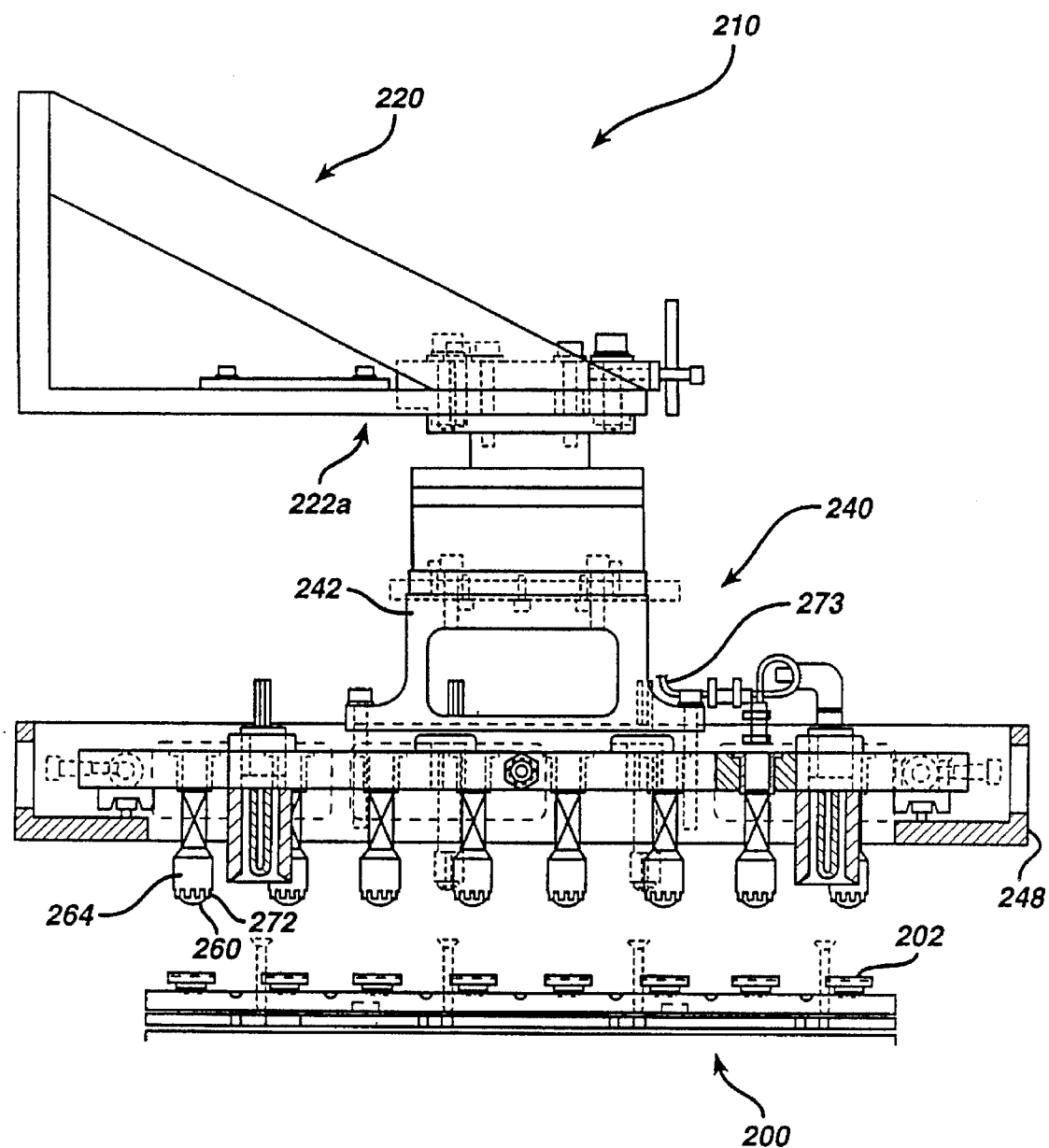
Figure 5C:
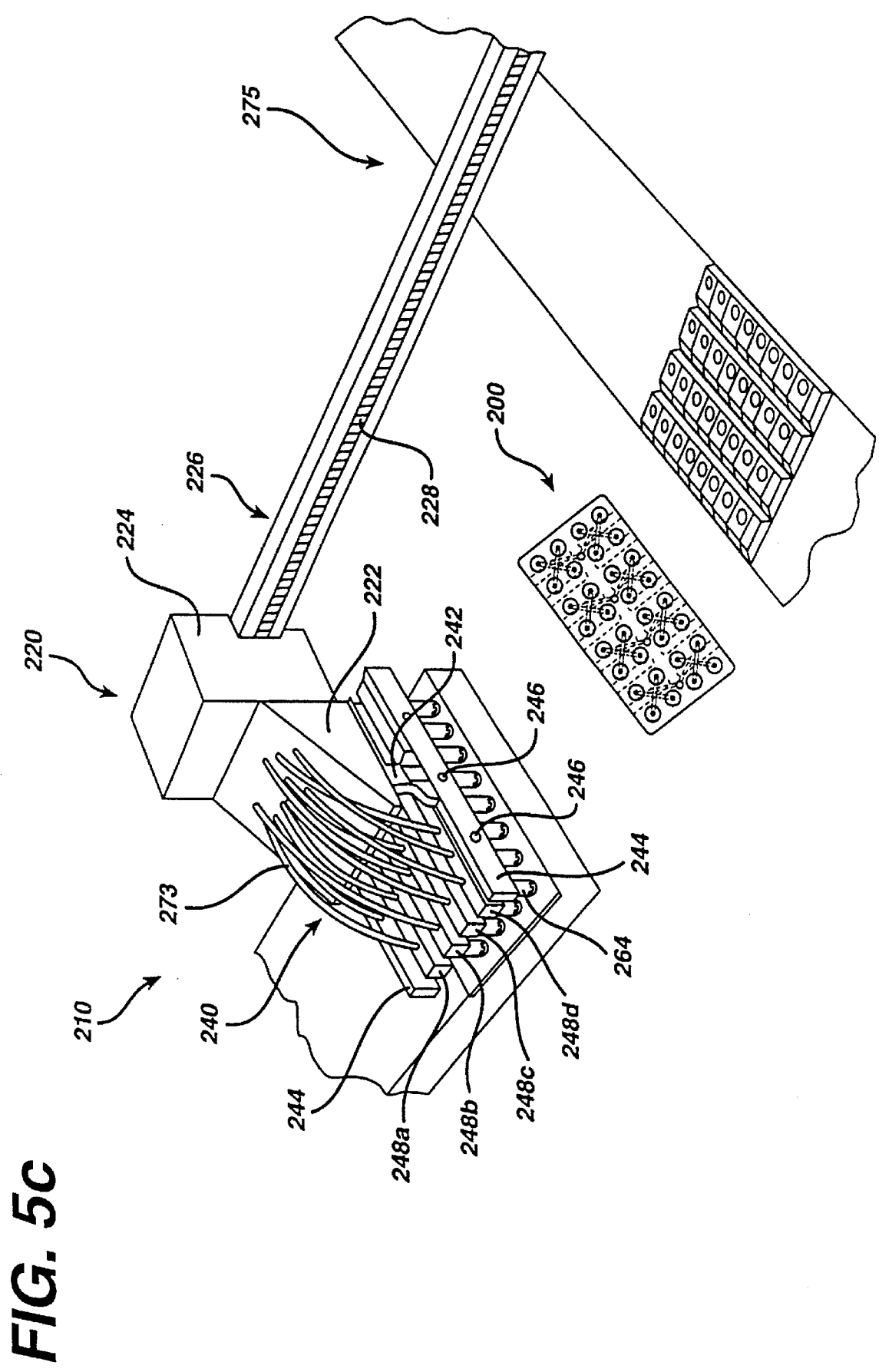

Referring now to FIGS. 5a, 5b, and 5c, the contact lens transfer assembly 210 is shown in side, top and perspective views, respectively. The assembly 210 generally comprises a head element 240 and a dual axis linearly translating mounting unit 220. First, with respect to the dual axis linearly translating mounting unit 220, a mounting bracket 222 is coupled at its lower horizontal surface 222a to the head element 240. The mounting bracket 222 is, in turn, mounted to a base element 224, in relation to which, the mounting bracket 222 may be raised or lowered by means of a vertically oriented translation mechanism. It is understood that a variety of means may be employed for the raising and lowering of the mounting bracket 222 including an articulated robot. However, a preferred mechanism comprises an IKO ball screw drive system to reciprocally translate the head from position to position.

As illustrated in FIG. 5c, the base element 224 is mounted to a horizontal track 226, along which it translates in accordance with the actuation of a motive means. In FIG. 5c the motive means 228 is shown to be a ball screw drive, however, it is understood that a variety of alternative translation means may be employed to provide an equivalent function. For example, the translation means may comprise a hydraulic or pneumatic piston/cylinder device, or it may comprise a scissoring arm assembly. The ball screw is preferred for its accuracy, mechanical simplicity, long term operability, and efficiency.

With respect to the head element 240, a coupling element 242 is affixed at its upper end to the lower surface of the mounting bracket 222. The lower end of the coupling element 242 is mated to a pair of guide plates 244 which are substantially parallel and held in spaced relation to one another by cross bars 246. Slidably mounted on the cross bars 246, also in spaced apart relation to one another, is a set of four horizontal support beams 248. The support beams 248 slidably mounted on the cross bars 246 so that they may be drawn together or spread apart in accordance with their appropriate positioning.

The means by which the support beams 248a–d may be moved relative to one another is provided by a pair of piston/cylinders 250,252. The embodiment of FIG. 5b shows the first piston/cylinder 250 couples the two inner beams 248b,c, and the second piston/cylinder 252 couples the two outer beams 248a,d. As shown in FIG. 5b, the second piston/cylinder is mated directly to a bracket 254 on one of the outer beams 248a, and mated to a linkage plate 256 which couples the piston/cylinder 252 to bracket 260 which is attached to outer beam 248d. The first piston/cylinder 250 is coupled directly to brackets 262a,262b which are in turn mated to the two inner beams 248b,c.

Extending downward from each support beam 248a–d are a plurality of finger elements 264, to which the lenses adhere during transfer. In the preferred embodiment, there are thirty-two fingers 264, mounted in a 4×8 array of four beams and eight fingers per beam, which correspond to the thirty-two recesses 202 of the lens hydration pallet 200. Selective actuation of the piston/cylinders 250,252, which causes the beams to move relative to one another, causes the relative spacing of the finger elements 264 to be altered.

Figure 6:
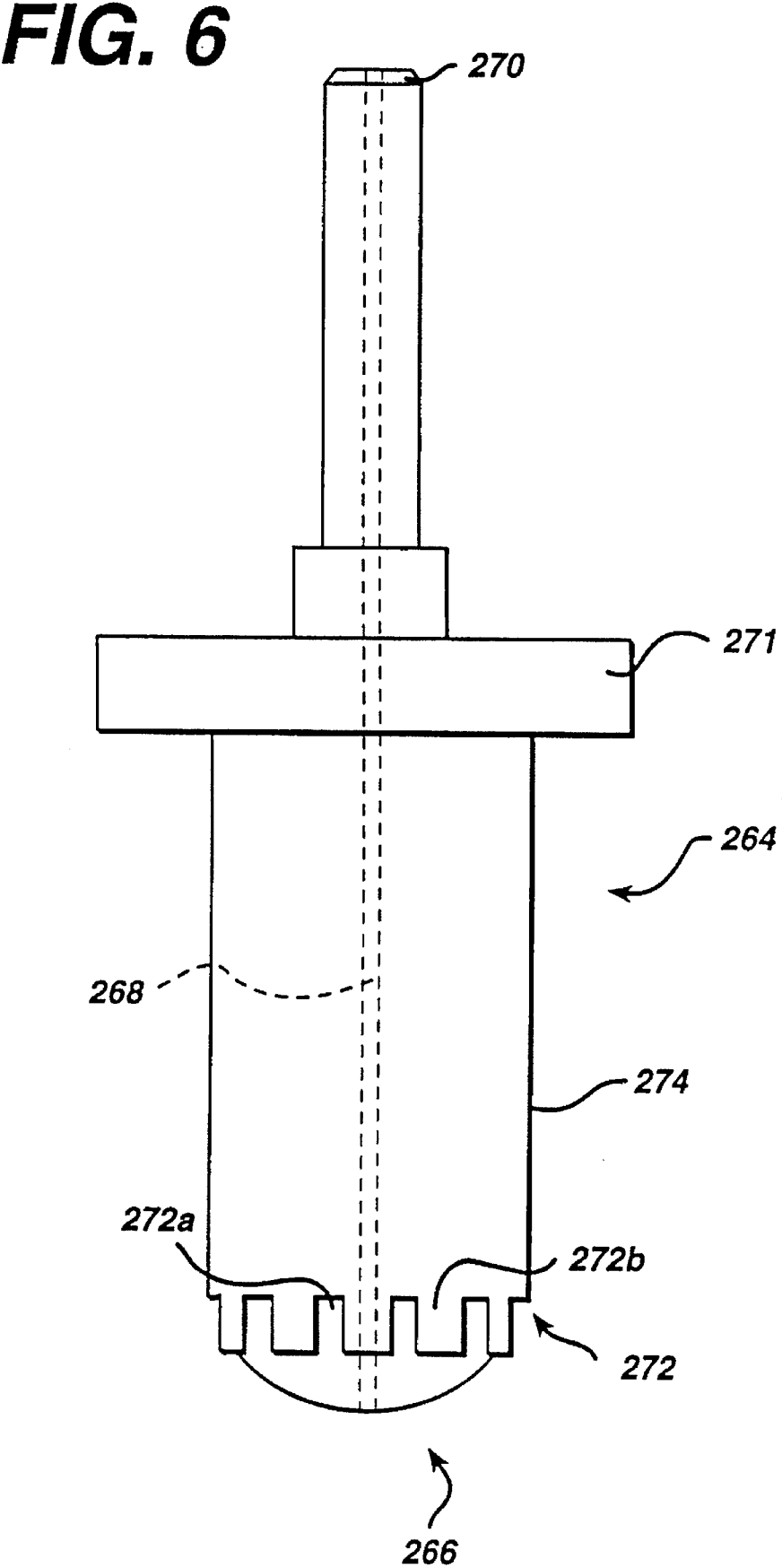
FIG. 6 is a side view of a finger element of the lens transfer and insertion assembly onto which the lenses are disposed.

Referring now also to FIG. 6, a side view of a finger element 264 is provided. The finger element 264 comprises an elongate shape having a convex lens attachment surface 266, the curve of the surface 266 generally corresponding to the curvature of the concave surface of a contact lens. A central bore 268 extends through the finger 264 from the top 270 to the lens transfer surface 266. This bore 268 is included for the selective ejection of a fluid therethrough, which fluid may be deionized water, as will be discussed below with respect to the deposition of a lens into a corresponding packaging element 40.

The end of each finger 264 includes an annular slotted skirt 272 which separates the curvate shape of the lens transfer surface 266 from the generally cylindrical shaft portion 274 of the finger 264. This slotted skirt 272, which includes alternating vertically oriented slots 272a and skirt elements 272b helps retain the lens on the attachment surface 266 and prevents it from sliding, or otherwise moving out of a desired position. The vertically aligned slots 272a are designed to provide a channel through which a fluid or gas which is directed upwardly at the lens transfer surface may flow smoothly. The skirt elements 272b are provided to prevent a contact lens from sliding off the lens transfer surface when said fluid or gas is directed at the surface.

A circular mounting disc 271 is disposed about the cylindrical shaft of the finger 264, at a position remote from the tip 266. The mounting disc 271 may be coupled to the upper or lower surface of the corresponding support beam 248, such that the top of the finger 264 may be coupled to an external supply of fluid such as deionized water with the lens transfer surface 266 extending downward. In either case, the tops 270 of the fingers 264 are coupled to tubes 273, which are preferably flexible, and which may selectively supply fluids such as air or deionized water to the central bore 268 in accordance with the predetermined operation of the assembly.

As illustrated in FIG. 5c, in operation a hydration pallet is advanced along the lens conveyor line 275 to a position directly beneath the lens transfer assembly 210. The dual axis linearly translating mounting unit 220 lowers the head array 240 so that the lens transfer surfaces of the fingers 264 are positioned directly above the recesses 202 of the pallet. Once in position, a quantity of air is directed through the conduits 206,208 in the plate. This air floats the contact lenses out of the recesses 202, and onto the lens attachment surfaces 266 of the fingers 264. As the lenses have been carried in the pallet through several extraction stations prior to arriving at the lens transfer assembly 210, the lenses and recesses 202 of the pallet have residual deionized water thereon. This deionized water assists the lenses in adhering to the surface 266 of the finger 264 via surface tension. While the lens will adhere to the curved lens attachment surface 266 with or without an additional surfactant, a surfactant may be added to more efficiently wet the surfaces together and promote retention of the lens by virtue of the surface tension of the deionized water and the surrounding atmospheric pressure. In the transfer, it is desirable to position each of the finger tips 266 within 1.5 mm of the lens to ensure a direct and precise transfer.

Occasionally the outer surface of the lens may have bubbles of air, in the deionized, water attached to it. If the bubbles remain, and are not dissolved, or otherwise removed from the lens, subsequent inspection of the optical correctness of the lenses will be compromised. Degassed ionized water is used in the hydration apparatus to minimize bubble formation, and in order to ensure that air bubbles are removed from the surface of the lens, when the head element 240 and fingers 264 are raised, the mounting assembly transports them to a bubble blow off unit 280 disposed between the hydration conveyor line 275 and the packaging element pallet line 102.

Figure 7:
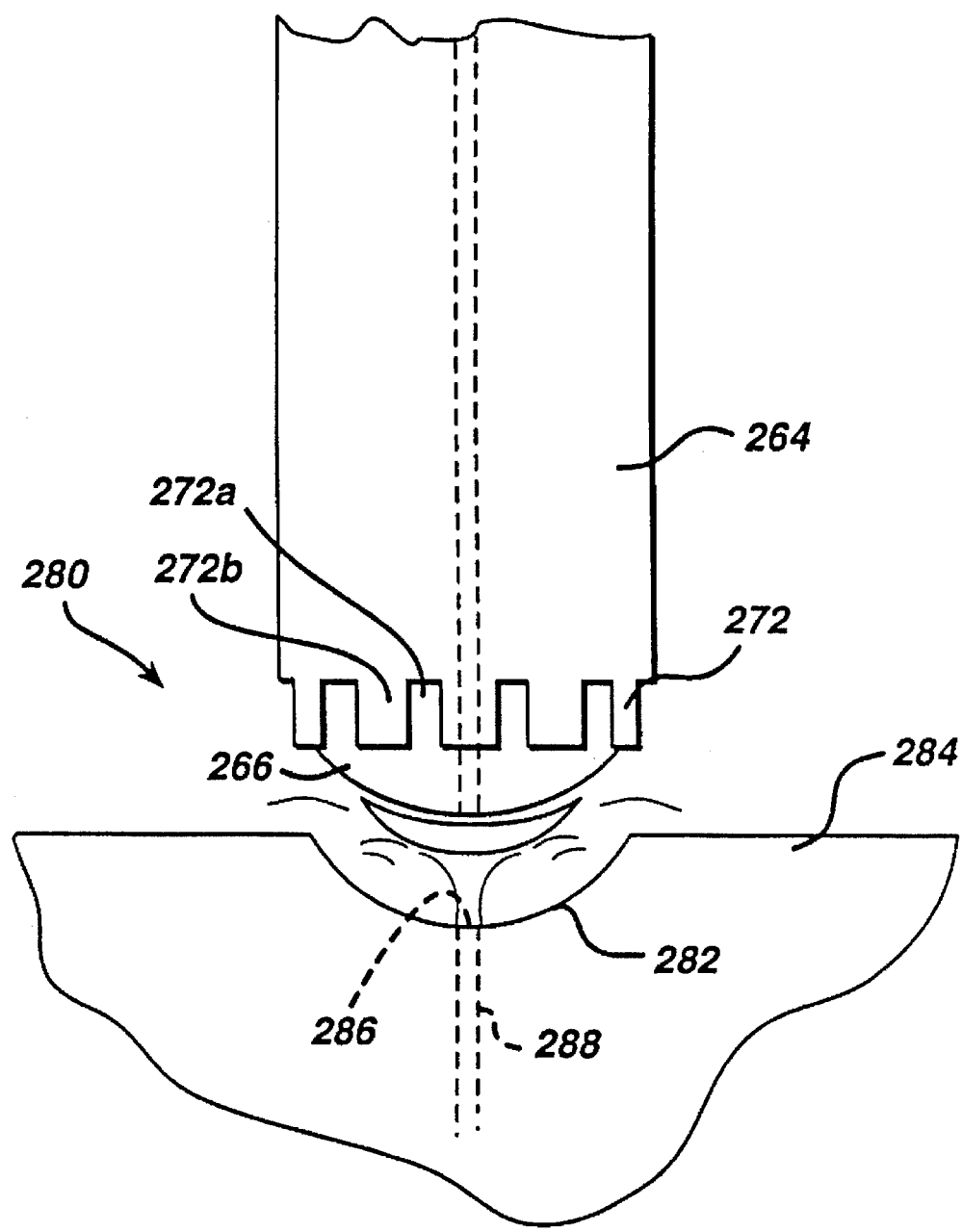
FIG. 7 is a cross-sectional view of the air bubble removal fluid ejection mechanism for removing bubbles from the exterior surface of the contact lenses.

Referring now to FIG. 7, a cross-sectional view of finger 264 carrying a lens and a recess 282 of the bubble blow off unit 280 is shown. The bubble blow off unit 280 comprises a plate 284 having a regular array of recesses 282 therein. The regular array of recesses 282 is designed to match the spacing of the fingers 264 of the lens transfer assembly head 240. The base of the recess 282 includes a through hole 286, which forms the mouth of a conduit 288 which extends downward to an air supply means. Selective ejection of air through the conduit is directed at the lens which is adhered to the lens attachment surface 266 of the finger 264. The force of the jet of air may cause the lens to migrate across the attachment surface 266, however, the slotted skirt 272 prevents the lens from sliding more than a portion of one lens radius from the center position. The jet removes the bubbles from the lens surface so that the inspection process will not falsely identify such air bubbles as fabrication errors in the lens itself.

Once the bubble removal process has been carried out, the piston/cylinders 250,252 are actuated to bring the beams 248 together. This change in relative distribution of lenses perpendicular to the beams 248 (whereby the four rows of eight fingers are brought closer to one another, but the spatial separation of fingers within the rows remains unchanged) is necessary because the distribution of packaging elements on the inspection pallet 40 is set in accordance with the inspection station apparatus, which is not the same as the relative spacing of the lenses during molding or hydration.

Once the piston/cylinders 250,252 have set the fingers 264, and the lenses thereon, into the properly distributed array, the horizontally oriented translation means 228 transports the head element 240 and the lenses to a position above the pallet 40 on conveyor line 102. With the lenses are positioned above their corresponding recesses 202, a quantity of deionized water is discharged from the tip of the finger, via the central bore 268, into the space between the lens and the lens attachment surface. This quantity of deionized water is sufficient to disrupt the surface tension adhesion of the lens to the surface, causing the lens to be carried along with the water into the package element 10.

The contact lenses and lens-package elements are carried on the pair of inspection pallets 40, by the conveyor 102 to the next station which is the buffering station. The fingers of the lens transfer assembly then return to their open spatial array, and the head element 240 is reciprocated back to its receiving position above the hydration conveyor line 275, and awaits the next batch of contact lenses.

THE BUFFERING STATION (SEGREGATOR & INTEGRATOR DEVICES)

The process of manufacturing contact lenses is in large part determined by the handling requirements of the lenses themselves. For example, one of the most important restrictions around which all of the molded article handling assemblies are designed is that the optical surfaces should not be touched. The handling requirement which is most relevant to the present assembly is that the lenses, once hydrated, must not be allowed to remain dry for more than 15 minutes.

As is the case with most manufacturing line machinery, the assemblies of the present invention, which together form the post lens hydration apparatus, require periodic maintenance and/or refilling with materials used in manufacturing. For example, the primary packaging station (the saline solution injector and foil sealing assemblies) requires periodic replacement of the foil material which is heat sealed to the packaging elements. The performance of other assemblies, however, are susceptible to being interrupted. However, the molding assemblies need to be kept in continuous operation for proper equilibration which is critical for optimal yield quantities.

In order to ensure that certain assemblies be permitted to run continuously, and still provide for periodic maintenance or resupply of other stations, one or more buffering station are necessary. The ideal position for a buffering station must be one where the lenses remain in an aqueous environment. The buffering station of the present invention is positioned between the lens transfer assembly and the inspection station.

The pallets 40, which have been filled with deionized water, and into which contact lenses have been deposited, each define a 2×8 array. In pairs, the pallets define a 4×8 array. At the lens insertion station (the lens transfer assembly) the pairs of pallets are advanced side by side; the elongate axis defined by the columns of 8 recesses, of each pallet being parallel to the direction of motion of the conveyor line.

Figure 8:
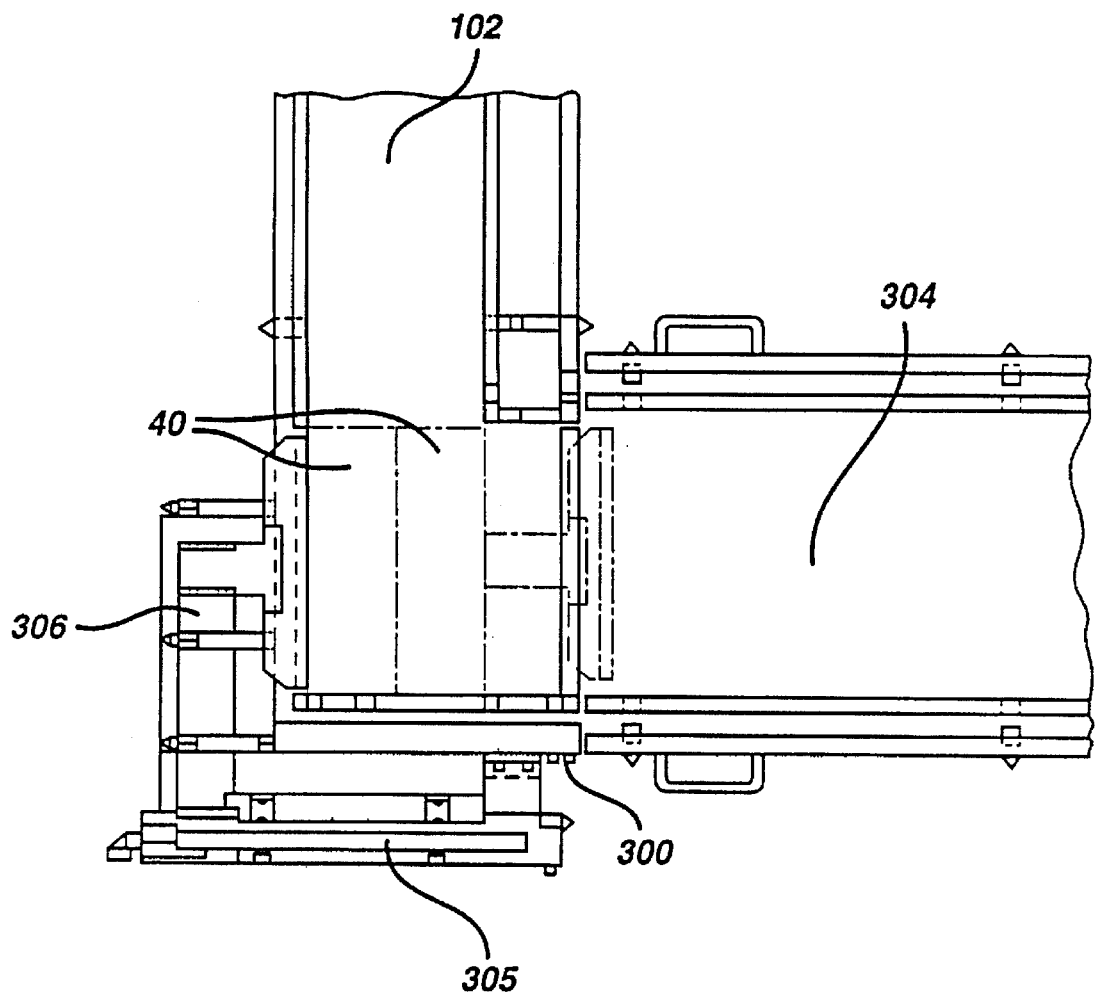
FIG. 8 is a top view of the pallet transfer unit which transfers pairs of pallets from the lens transfer conveyor line to the buffer conveyor line.
Figure 9:
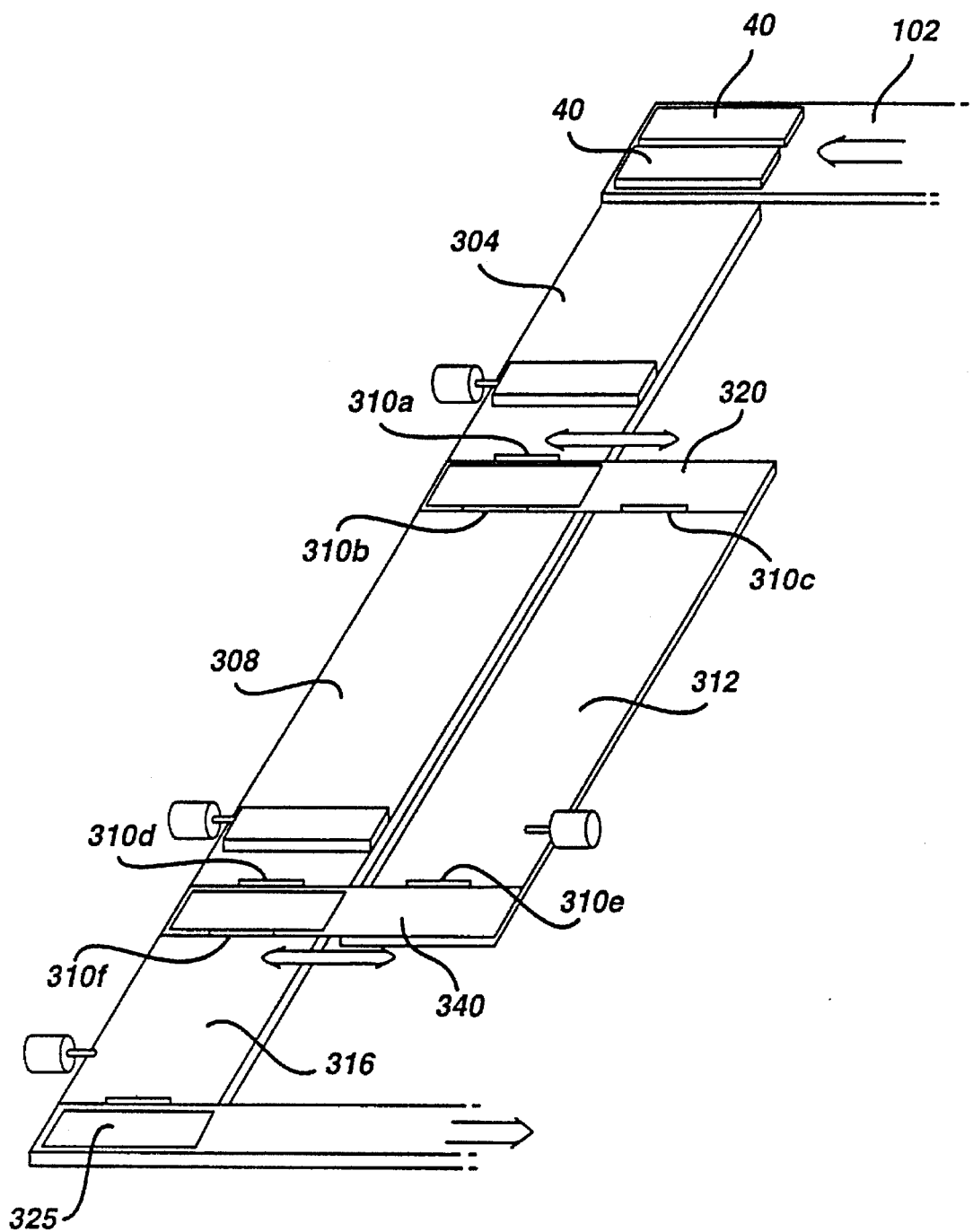
FIG. 9 is a perspective view of the buffer station through which the pallets carrying the lens-packaging elements are directed.

Referring now to FIGS. 8, 9, 10 and 11, which are perspective views of the buffering station, including the segregator unit, and the integrator unit, respectively. As illustrated in FIG. 9, the buffer station comprises first, second, third, and fourth segments 304,308,312,316 of a conveyor line, each of which is disposed for movement of pallets in the same direction. A segregator unit 320 is positioned after the first segment 304, and an integrator unit 340 is positioned before the fourth segment 316. The second and third segments 308,312 run parallel to one another, each beginning at the segregator unit 320 and ending at the integrator unit 340.

A first segment 304 of the buffer conveyor line is disposed perpendicularly to the lens transfer conveyor line 102 which advances the pallets from the lens transfer assembly, as set forth above. Referring specifically to FIG. 8, the end of the lens transfer conveyor line 102 and the beginning of the first segment 304 of the buffer conveyor line, and the lateral pallet transfer unit 306 which transfers the pallets 40 from the former to the latter are shown in a top view. As the pairs of pallets 40 reach the end of the lens transfer conveyor 102 they are stopped from advancing by a guide 300. The pallets 40 are then pushed by a push plate 302 from the lens transfer conveyor line 102, onto the first segment 304 of the buffer conveyor line.

More particularly with respect to the motion of the pusher plate 302, the pusher plate 302 includes an arm 303 extending from its back portion which is motively coupled to a slide element 305 which is disposed beyond the wall element 300. Selective actuation of the slide element 305 in the forward direction provides the linear lateral motion of the pusher plate 302 and transfers the pallets 40 to the first segment 304 of the buffer conveyor. Reverse actuation of the slide element 305 reciprocates the pusher plate 302 into position to receive the next pair of pallets 40. It is understood that a variety of mechanisms may be employed which provide the appropriate motion of the pusher plate; examples being a ball screw drive, hydraulic, pneumatic, or air piston/ cylinder elements, or mechanical scissoring devices.

As the pairs of inspection pallets 40 are transferred to the first segment 304 of the buffer line, they are translated from a parallel relationship to a tandem relationship, because the segment 304 is oriented perpendicularly with respect to the lens transfer conveyor 102. The pair is now advanced in tandem with one pallet following the other, each having its elongate axis oriented perpendicularly with respect to the direction of motion of the first segment 304 of the buffer conveyor.

The pallets 40 are advanced in tandem to the segregator unit 320 which permits alternating pallets 40, for example the first of the pairs, to advance linearly onto a second segment 308 of the buffer conveyor line; the second segment 308 of the buffer conveyor line being co-linear with the first segment 304. A vertical stop mechanism 310a, which is similar in form and function to the vertical stop 120 of the deionized water injection assembly, is disposed before the segregator 320 to permit only one pallet of the pair onto the segregator 320. With respect to the second pallets of the pairs, the segregator 320 transfers them to the third segment 312 of the buffer conveyor, which runs parallel to the second segment 308.

Vertical stops 310b,310c which are disposed on the second and third segments 308,312 of the buffer conveyor line, are positioned to prevent premature advancement of the pallets 40 on the conveyors until transfer is completed.

The segregator 320 is continuously engaged, providing both a constant spacing of individual pallets 40 from one another, and providing a dual track holding line for the pallets 40 during interruptions in the subsequent assemblies of the manufacturing line. The pallets 40 thereby form parallel lines extending along the second and third segments 308,312 for distances which are determined to be sufficient to store the number of pallets 40 which will be produced during normal service interruptions in the manufacturing line, as for example twenty minutes.

At the distal ends of the second and third segments 308,312, an integrator unit 340 is provided to merge the two streams of pallets 40 so that they may advance, in a regularly spaced unitary stream, along the fourth segment 316 of the buffer conveyor, to the inspection station. Again, vertical stops 310d,310e are positioned at the ends of the segments 308,312 respectively, and are engaged to ensure that only one pallet 40 enters the integrator at a given time.

The integrator 340 remains engaged during normal operation of the manufacturing line, but is disengaged to stop the advance of any further pallets 40 when an interruption occurs. During this time, the pallets 40 which continue to advance from the lens transfer assembly are stored in parallel lines on the second and third segments 308,312 of the buffer conveyor. Once the interruption ends, the integrator 340 is reengaged and merges the stored pallets in a continuous stream. A final vertical stop 310f is disposed at the outlet of the integrator 340 to prevent premature advancement or skewing on the powered conveyor, and to enable spacing between pallets 40 on the fourth segment 316, as they enter the inspection station.

Figure 10:
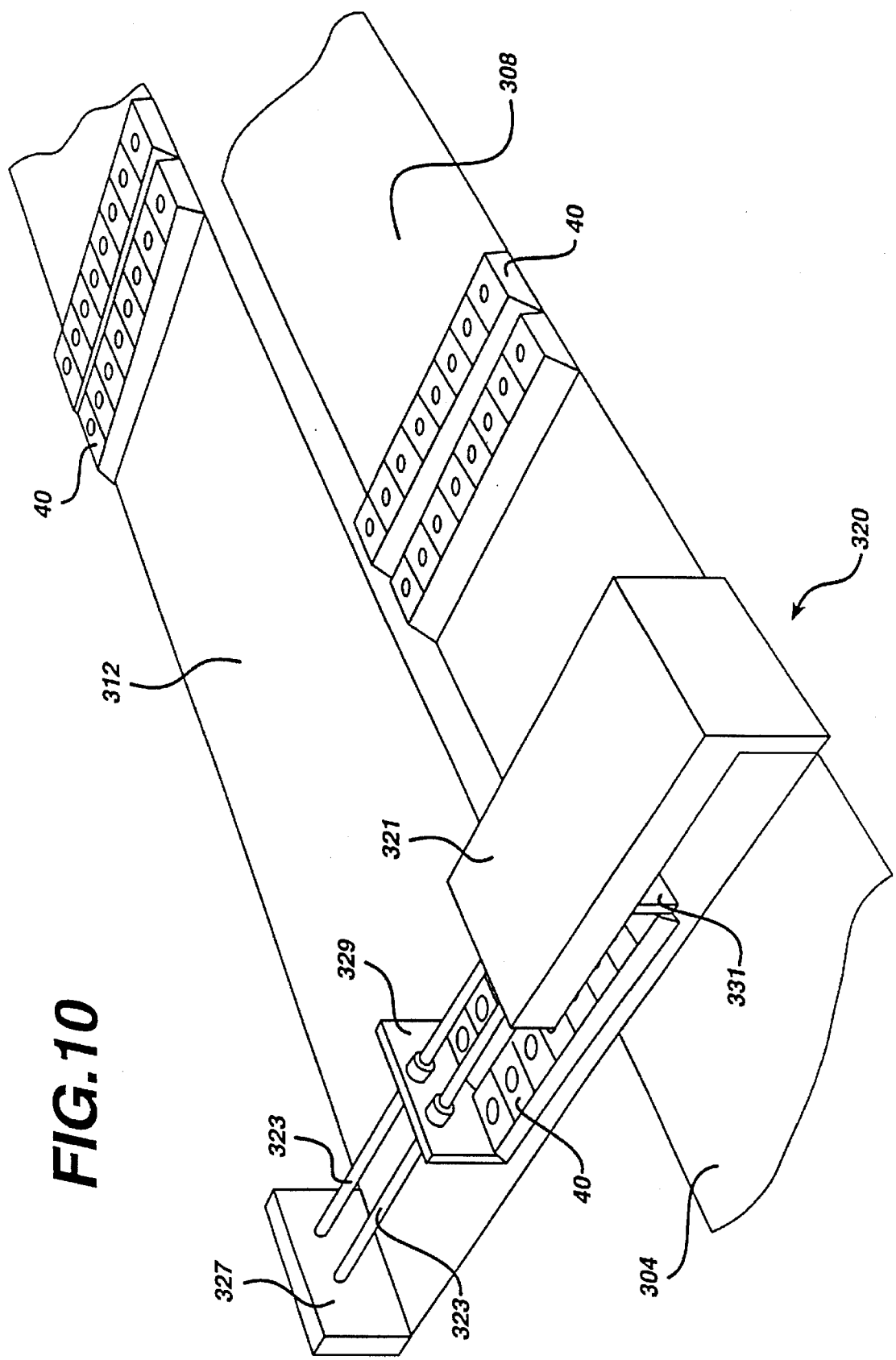
FIG. 10 is a perspective view of the segregator device which is disposed at the entrance to the buffering station.

Referring specifically to FIG. 10, which is a perspective view of the segregator unit, particular attention is provided to the features and function of the segregator 320. A housing 321, which is an inverted L-shaped member is mounted to the lateral edge of the conveyor line, at the coupling point of the first and second segments 304,308. Extending outward from the L-shaped member 321 are a pair of substantially parallel guide rails 323. The rails 323 are received by a stationary plate 327 which is mounted to the outside lateral edge of the third segment 312 of the buffer conveyor. A first moving plate 329 is slidably mounted to the guide rails 323 such that the plane of this first plate 329 is aligned vertically and parallel to the direction of conveyor motion. This first plate 329 reciprocates from a first position between the second and third conveyor segments 308,312 and a second position at the stationary plate 327. A second moving plate 331 is similarly mounted to the guide rails 323, and to a motive means (not shown) such that it may be reciprocated from a position at the outside lateral edge of the second conveyor segment 308 to a position between the second and third segments 308,312. The first and second plates 329,331 are maintained in a spaced apart relation such that a pallet 40 may be transferred therebetween, from the first segment 304 to the third segment 312 upon selective reciprocation of the plates 329,331 along the guide rails 323.

In operation, as can be inferred from FIG. 10, the reciprocation of the plates 329,331 is selectively controlled such that alternating pallets are transferred to the third segment 312. It is understood that a variety of motive means and/or coupling means may be utilized for reciprocating the plates 329,331 together, for example the guide rails may comprise a threading and the mounting of the plates 329,331 thereto comprises a nut which may be translated along the guide rails 323 by the rotation thereof. A separate, but equivalent, design includes an air piston/cylinder mounted within the L-shaped member 321 which is coupled to the driving plate 331 and which reciprocates it. In such a design, a coupling means, for example a fixed rod mated to both plates 329,331, must be utilized to slave the motion of plate 329 to the motion of the dive plate 331.

Figure 11:
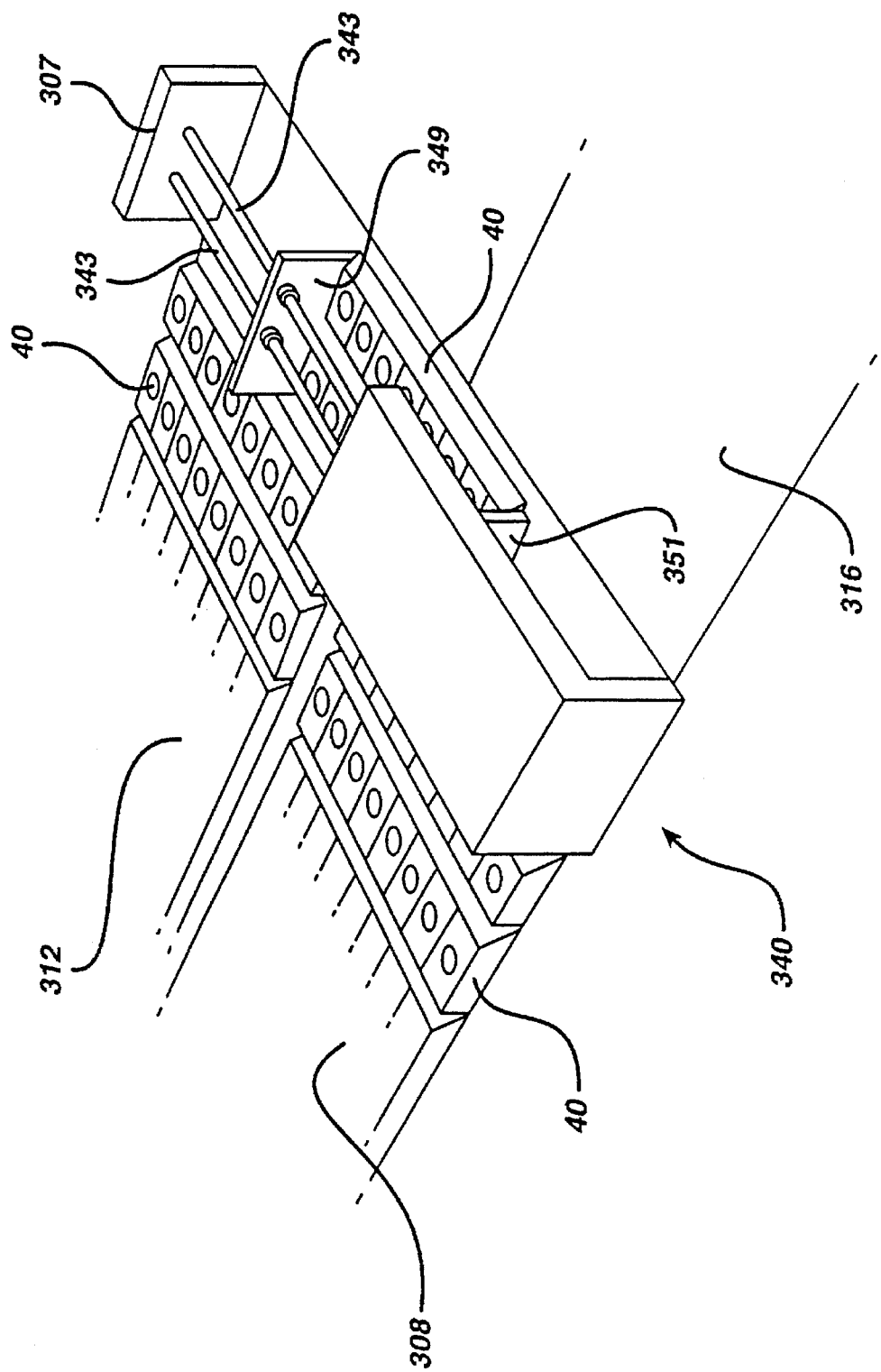
FIG. 11 is a perspective view of the integrator device which is disposed at the exit of the buffering station.

Referring now to FIG. 11, which is a perspective view of the integrator unit, a detailed description of the features and functions of the integrator unit is provided. Similar in many respects to the segregator unit 320, the integrator is essentially the same device which operates in reverse. A housing element 341, which is L-shaped and mounted to the outside lateral edge of the second segment 312 of the buffer conveyor. A pair of guide rails 343 extend outward from the housing member 341 and are received by a stationary plate 347, mounted to the outside lateral edge of the third segment 312 of the buffer conveyor. A set of spaced apart moving plate 349, 351 are slidably mounted to the guide rails 343 such that the planes of these plates 349,351 are aligned vertically and parallel to the direction of conveyor motion. The second moving plate 351 is coupled to a motive means (not shown) such that it may be reciprocated from a position at the outside lateral edge of the second conveyor segment 308 to a position between the second and third segments 308,312. The first and second plates 349,351 are maintained in a spaced apart relation such that a pallet 40 may be transferred therebetween, from the third segment 312 to the fourth segment 316 upon selective reciprocation of the plates 349,351 along the guide rails 343.

In operation, as can be inferred from FIG. 11, the reciprocation of the plates 349,351 is selectively controlled such that alternating pallets, one from the second segment 308 followed by one from the third segment 312, advance to the fourth segment 316. It is understood that a variety of motive means and/or coupling means may be utilized for reciprocating the plates 349,351 together, for example the guide rails 343 may be threaded matable to a threaded hole or nut in the plates 349,351. A separate, but equivalent, design includes an air piston/cylinder mounted within the L-shaped member 341 which is coupled to the driving plate 351 and which reciprocates it. In such a design, a coupling means, for example a fixed rod mated to both plates 349,351, must be utilized to slave the motion of plate 349 to the motion of the drive plate 351.

THE LOW VIBRATION LENS-PACKAGE TRANSPORT ASSEMBLY, THE INSPECTION ASSEMBLY, AND THE WATER EXTRACTION ASSEMBLY

Figure 12:
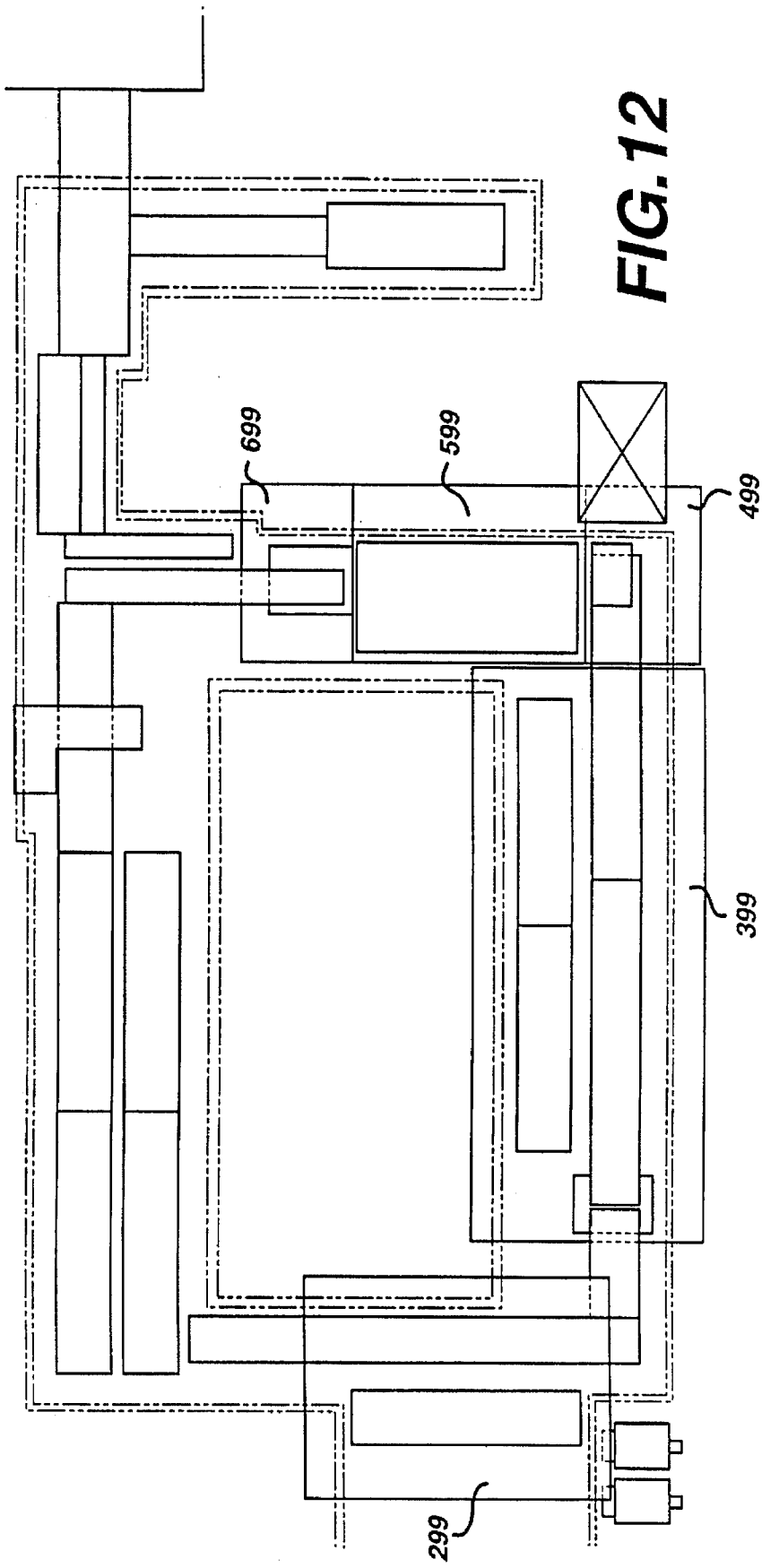
FIG. 12 is an overview showing the assembly station locations of the post hydration apparatus of the present invention, including the inspection station and the deionized water extraction assembly.

Referring now to FIG. 12, a top view diagrammatic of the present invention is provided. As is illustrated, the lens transfer station 299, where the lenses are transferred to the packaging elements on the inspection pallets 40 is sequentially followed by the buffering station 399. The pallets, having advanced through the buffering station are transferred through a conveyor station 499 to the inspection station 599, by a low vibration conveyor assembly as described hereinbelow.

Figure 13:
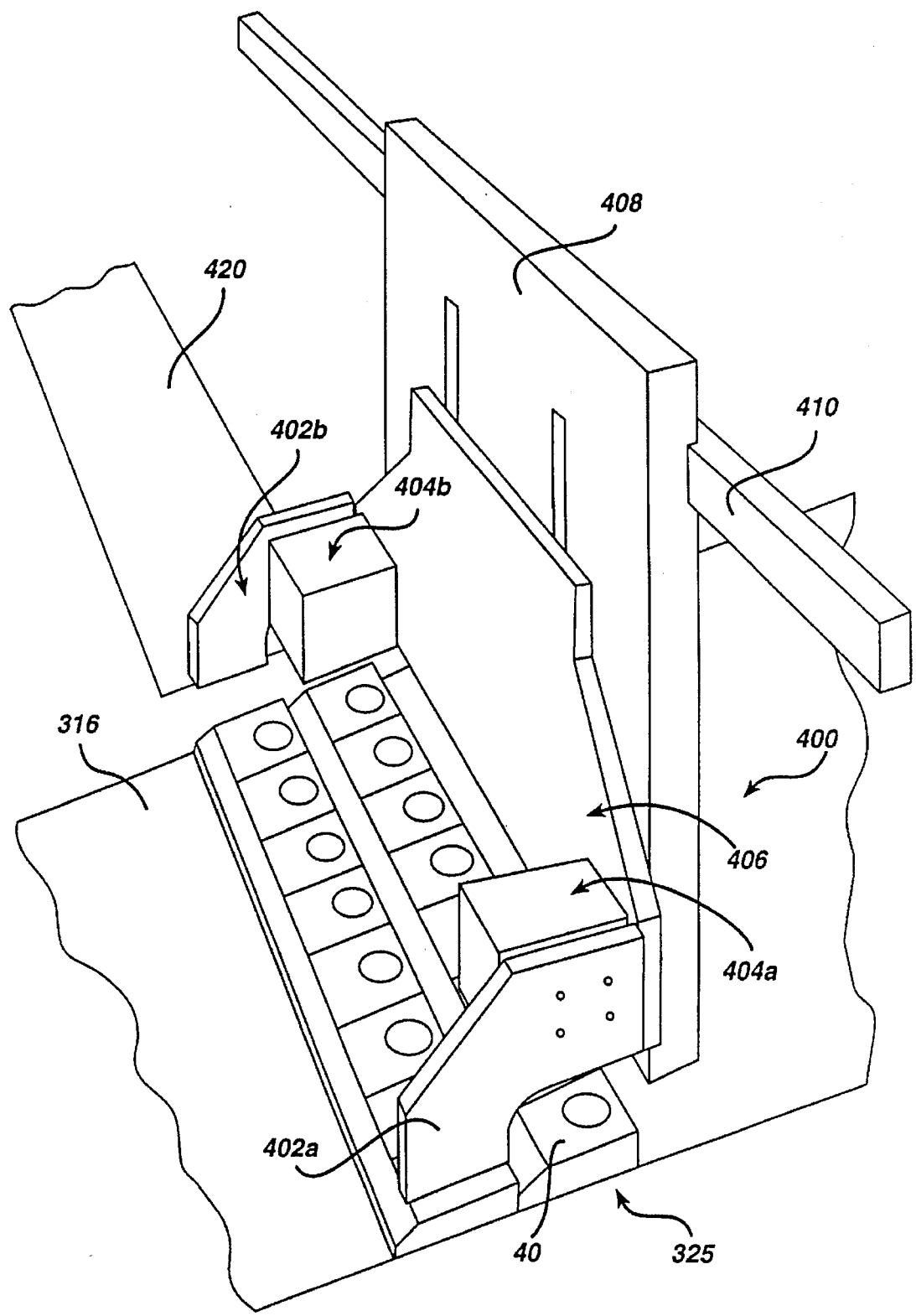
FIG. 13 is a perspective view of the low vibration pallet transfer assembly which transports the pallets carrying the lens-packaging elements from one conveyor line to the low vibration inspection conveyor line.
Figure 14:
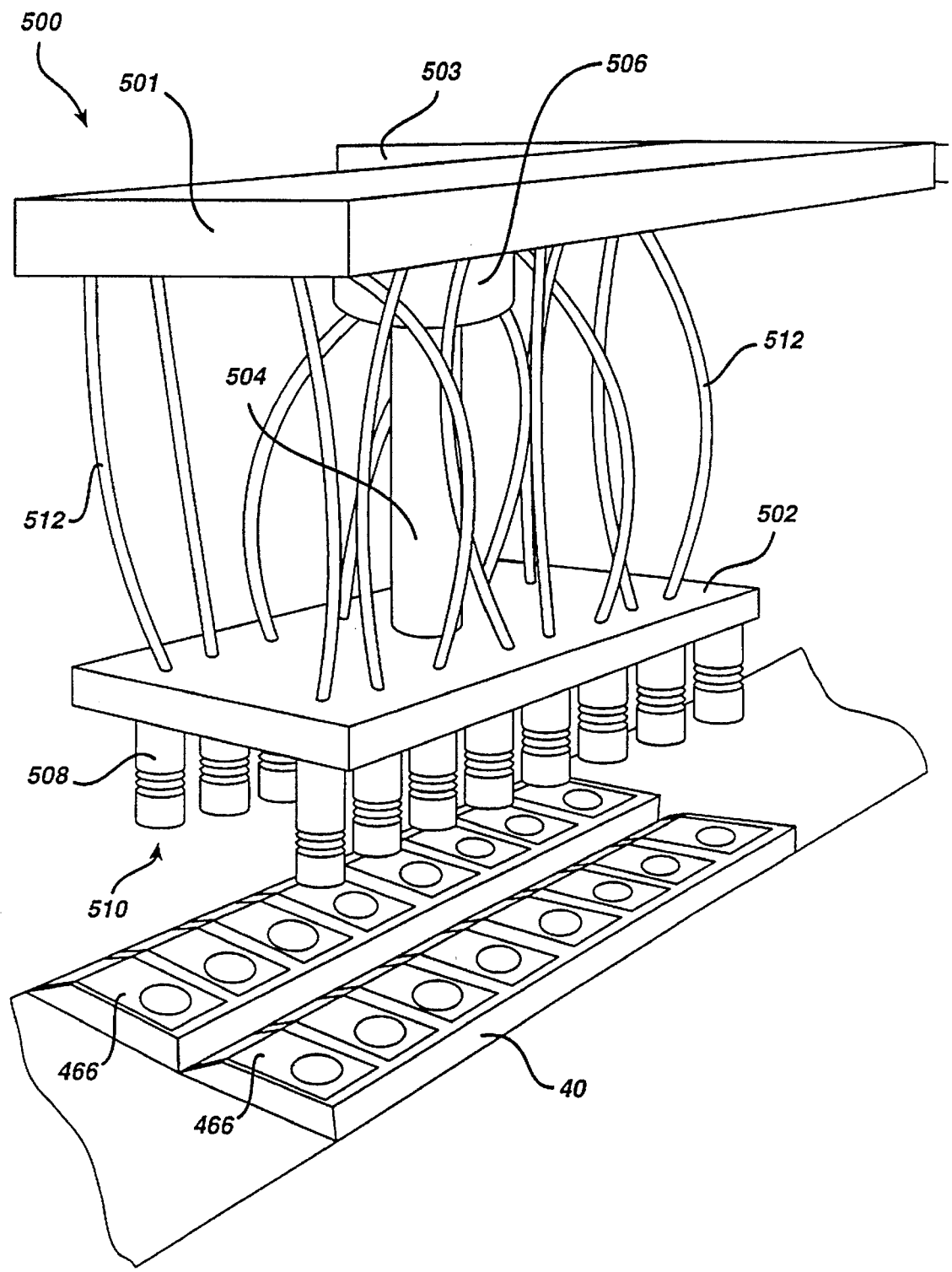
FIG. 14 is a perspective view of the first rotating lens-package transfer assembly which removes the packages and lenses from the inspection pallets and deposits the optically correct lens-packages on the good conveyor line.

FIG. 13 is a perspective view of the low vibration transfer assembly which transfers the inspection pallet from conveyor 316 to the inspection station. When a pallet 40 has passed through the integrator unit of the buffer assembly and has passed down the fourth segment of the buffer conveyor, it is translated to a staging area 325 as illustrated in previously described FIG. 9. At this staging area 325 an overhead double axis transport carrier reciprocates, picks up the single pallet 40 for transfer to the automatic lens inspection station as illustrated in FIG. 13. The overhead transport is a double axis Hauser Transport Mechanism, and is used to isolate the automatic lens inspection system from the remainder of the post-hydration line.

It is important that vibrations of the lenses and the deionized water be minimized during this transport, and through the entire inspection line so that water waves are avoided, as they can cause optical distortions which, in turn, may cause false determinations of lens quality. By utilizing a double axis transport mechanism, the pallet can be gently conveyed to the automatic lens inspection system, and thereby avoid such vibrations which that might otherwise impair the inspection results.

After the first pallet has been lifted from the staging area, the next pallet may be advanced into the staging area to be carried onto the inspection line conveyor. The double axis transport mechanism transports the pallets from the buffer conveyor, where the pallets are advanced at a given speed and spacing, to the inspection line, where the speed of the pallets is substantially slowed to avoid vibration. It is necessary, therefore, for the spacing of the pallets on the inspection conveyor to be substantially closer together so that the inspection conveyor may accommodate the same number of pallets in a given time.

The low vibration pallet transfer assembly 400 comprises a pair of pallet grasping plates 402a,402b which are mounted, in spaced relation to one another, to corresponding blocks 404a,404b. One of the grasping plates 402a is slidably mounted to its block 404a such that selective actuation of an extending mechanism (housed within block 404a) widens or reduces the spacing between the two grasping plates 402a,402b. The blocks 404a,404b are mounted to a common wall element 406 which is slidably mounted to a base element 408. A second motive mechanism (also not shown) is disposed within the base element 408 and coupled with the common wall 406 such that the wall 406 can be selectively raised and lowered. The base element 408 is mounted to a horizontal track 410 having a translating means for reciprocating the entire assembly from a position above the staging area 325 to the inspection station conveyor line 420.

In operation, the low vibration pallet transfer assembly 400 reciprocates to the staging area 325 to receive a pallet 40. The common plate 406 is lowered, thereby positioning the pallet grasping plates 402a,402b adjacent to the lateral edges of the pallet 40. The motive element within the block 402a is actuated to draw the plates closer, therein bringing the inner surfaces of the plates 402a,402b in contact with the pallet 40. Once the pallet has been grasped securely by the lateral plates 402a,402b, the common wall 406 is raised, and the pallet is transported to the inspection station conveyor line, which is disposed perpendicularly to the fourth segment 316 of the buffering conveyor line. Once in position above the inspection conveyor line 420, the pallet 40 is lowered onto the line and released by actuation of the plate widening mechanism. The pallet is then carried into the inspection station. Once the pallet is transferred to the low vibration lens transfer assembly 400 rises and reciprocates back to the staging area 325 to receive the next pallet 40.

In the Automatic Lens Inspection System, the inspection pallets 40 are conveyed through the system as a pulse of light is directed through the lens-packages and contact lenses, and focused on a camera to generate an image of the lens therebelow. Preferably, the camera includes an array of pixels, each of which generates a respective one electric signal proportional to, or representing, the intensity of the light incident on the pixel. Those electric signals are then digitally processed to determine if the lens is acceptable for consumer use. Suitable procedures for processing or analyzing the electric signals from the pixel array are disclosed in copending patent application Nos. 993,756 and 995,281 both now abandoned, entitled "Automatic Lens Inspection System", the disclosures of which are herein incorporated by reference. Separate systems are utilized to inspect the sixteen lenses carried in a pallet. After completing the test for the last bank of lenses, the Automatic Lens Inspection System sends a datablock with the vision inspection results to the programmable logic controller used to consolidate the lenses for packaging. This information is used by the lens-package transfer assembly as described below.

After the lenses have been inspected by the automatic lens inspection system, the pallet is lifted by second double axis overhead transport and placed on conveyor for transport to the deionized water removal station (which is station 699 in FIG. 12). The deionized water is removed by a specially configured nozzle, as described in U.S. Ser. No. 08/999,234, now abandoned entitled "Solution Removal Nozzle", the disclosure of which is hereby incorporated herein by reference thereto. As described earlier, the deionized water is used to center the lens within the package carrier during the inspection process, but is removed prior to packaging, to enable a precise dosing of a buffered saline solution in the final package, as will hereinafter be described in detail.

After removal of the deionized water, the lenses, package carriers and inspection pallet are transported to the lens-package transfer assembly which removes the packaging elements and lenses therefrom, deposits the optically incorrect lens-packages (as determined by the inspection station) on a conveyor for bad lenses, and deposits the correct lens-packages on good conveyor.

THE FIRST ROTATING LENS-PACKAGE TRANSFER ASSEMBLY

Figure 15:
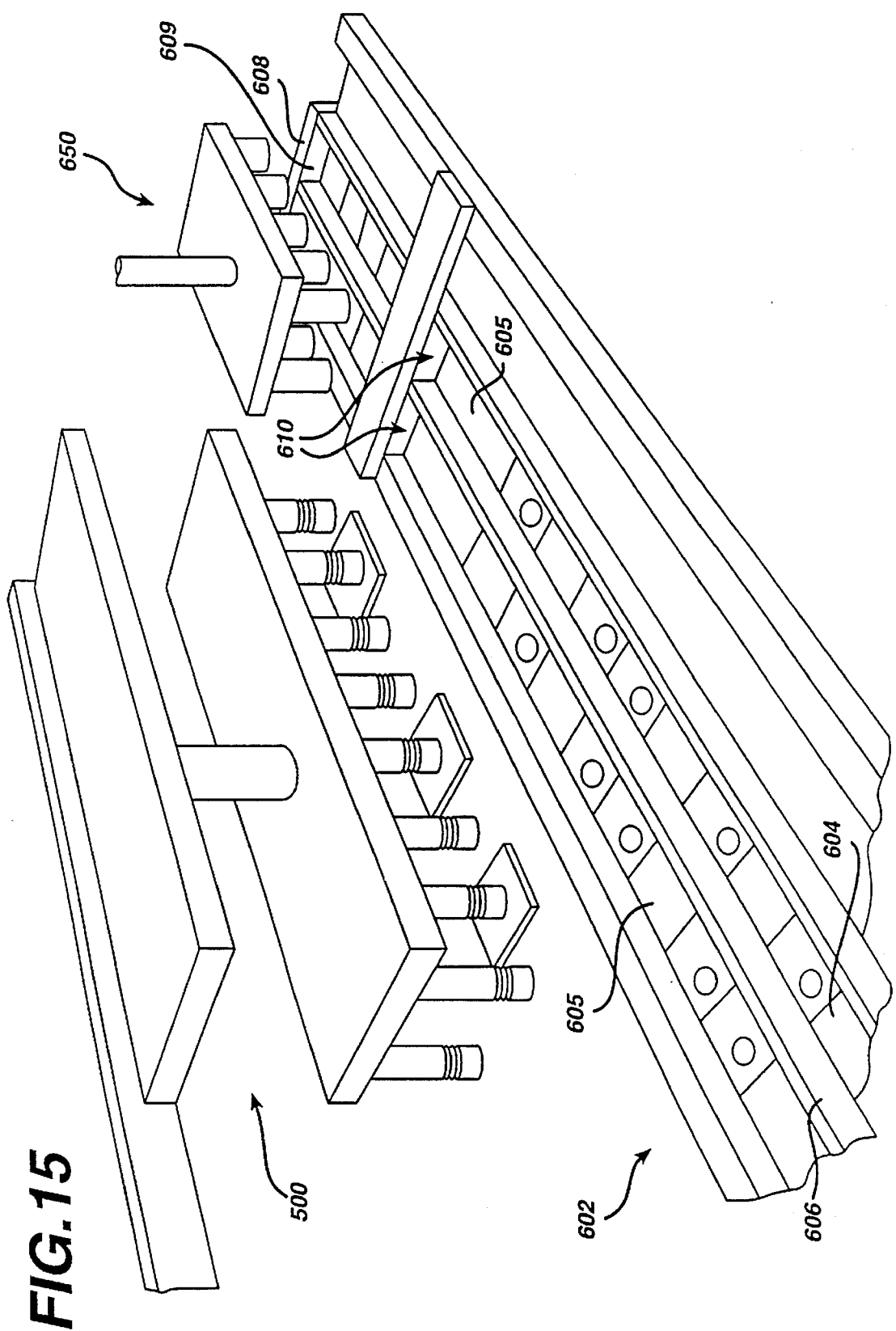
FIG. 15 is a perspective view of the good conveyor line which further serves to consolidate the lens-packaging elements into a regular array.

Referring now to FIG. 15, the lens-package transfer assembly is shown in a perspective view, in position above a pallet of lens-packages which have had the deionized water removed therefrom. The assembly 500 comprises a reciprocating support 502 coupled at the lower end of a vertical shaft 504. The shaft 504 is, in turn, coupled at its upper end to a rotation means 506 whereby the shaft 504 and the support 502 may be selectively rotated by 90 degrees in accordance with the predetermined positioning of a pallet 40 or the orientation of the conveyor (see FIG. 16) onto which the lens-packages are deposited. It is understood that the rotating means 506 may comprise an air cylinder having stops which, for example, correspond to a 90 degree rotation so that the shaft may be reciprocated between two orientations which are perpendicular.

The rotating means 506 is disposed within a mounting platform 501, which is in turn coupled to a dual axis transport subassembly (the horizontal track thereof is identified as element 503 in FIG. 15). The dual axis transport subassembly transports the support 502 from a first location to a second location, for example, from a position above the water extraction conveyor line to a position above the consolidating conveyor line (which is described more fully with reference to FIG. 16).

Extending downwardly from the support 502 are a set of resilient bellowed fingers 508 having a generally elliptical shape. The fingers 508 each have an open tip 510 at their lower ends which forms an entrance into a central volume which extends the length of the finger. The upper ends of the fingers 508 are coupled to the vacuum tubes 512 such that the central volume of the fingers are in sealed gas flow relation to tubes 512 which are individually coupled to a vacuum source (not shown). Each tube is separately valved; the valves being independently controlled by a processor in accordance with signals received from the inspection station with respect to which lens-packages contain correct lenses. Selective activation of the vacuum source would, therefore, provide a low pressure suction at the tips 510 of the finger 508. When this low pressure suction is employed, the tips 510 of the fingers may be placed onto a flat surface, therein sealing the central volume, and securing the flat surface to the finger 508.

In operation, a pallet 40 having lens-packages, from which the deionized water has been removed, is transported to the first location, the lens-packages being substantially aligned with the fingers 508 of the first rotating lens transfer assembly 500. The fingers 508 are directed downward until their tips 510 contact the flat surface portion 46b of the packaging element, forming a sealing interface therewith. Selective actuation of the valves controlling the drawing of a vacuum within each finger 508 causes the package elements and lenses to be lifted from the pallet. It is understood that all of the lens-packages may be removed from the pallet 40 and subsequent actuation of the valves may be utilized to deposit the incorrectly molded lenses on a separate, bad, conveyor, and the optically correct lenses on the good conveyor, or in the alternative, only the good lenses are transferred, and the rejected lenses are later removed from the inspection pallet by an alternative means. This procedure can be used to increase (shorten) the cycle time of the transfer device.

Once the appropriate lens-packages are removed from the pallet 40, the manifold 502 and fingers 508 are rotated 90 degrees by the rotating means 506 while simultaneously being reciprocated upward and laterally by the dual axis transport subassembly. The fingers 508 are repositioned over the consolidating conveyor, at which point the vacuum within the fingers 508 which are holding lens-packages is released, and the lens-packages are deposited on the conveyor.

Once the optically correct lens-packages have been so deposited, the assembly 500 reciprocates back to extract a new set of lens-packages from the next inspection pallet 40.

CONSOLIDATING CONVEYOR AND SECOND ROTATING LENS-PACKAGE ASSEMBLY

Figure 16:
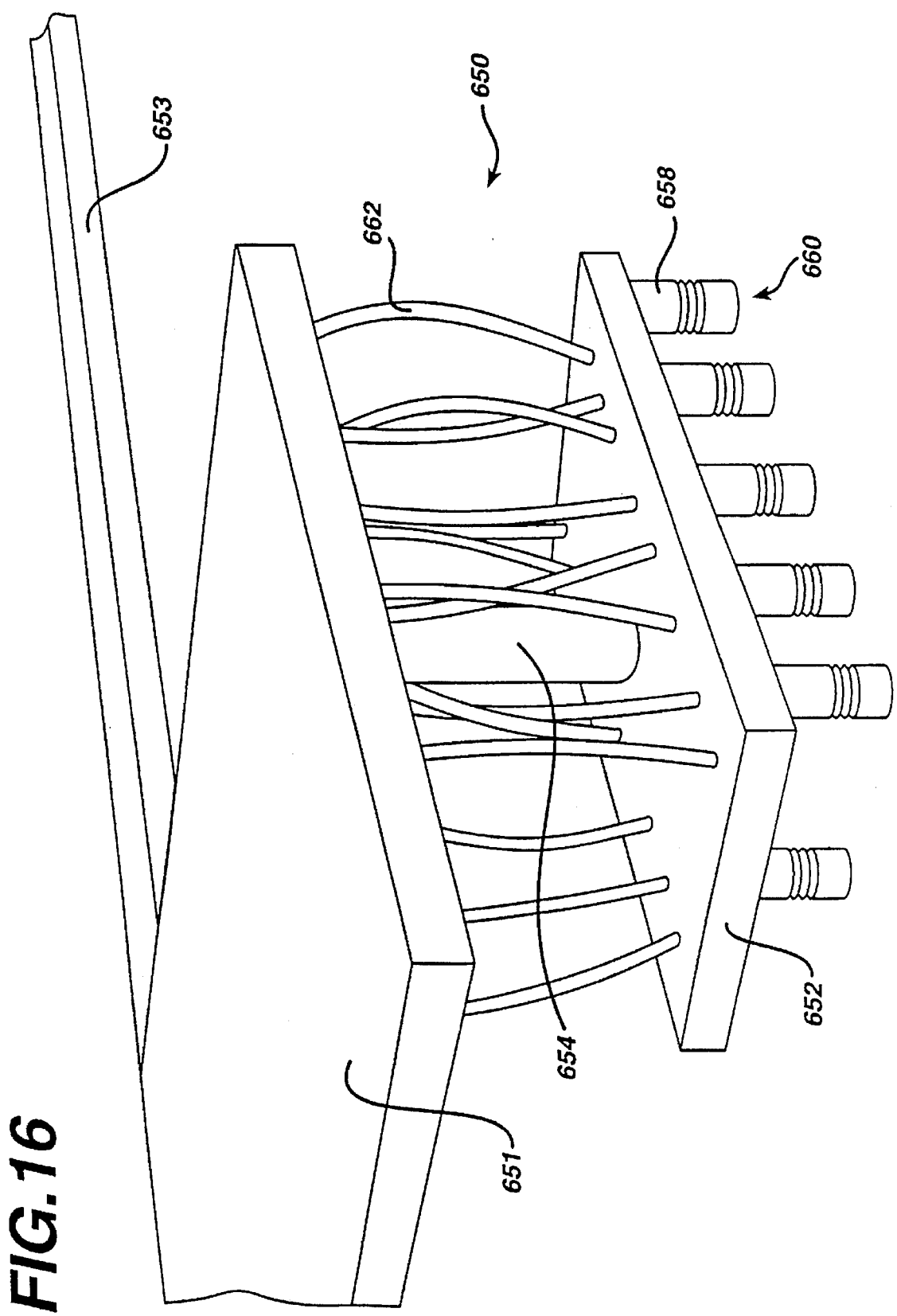
FIG. 16 is a perspective view of the second rotating lens-package transport assembly which removes regular arrays of lens-packaging assemblies from the good conveyor line and deposits them in pallets for saline injection and foil sealing.

The first rotating lens-package transfer assembly 500 deposits the optically correct lens-packages onto the consolidating conveyor 602 as shown in FIG. 16. The consolidating conveyor comprises a belt-type motive surface 604 onto which the two rows of lens-packages are transported. The conveyor surface 604 is divided into parallel longitudinal channels 605 by a guide wall 606. As shown in FIG. 16, the rows of lens-packages may not be regularly distributed on the conveyor surface when they are deposited.

The lens-packages are transported along the conveyor until the lead packages contact a moveable gate element 610. The gate element 610 interferes with the continued transport of the lead lens-packages in each of the channels 605. As the progression of the lead lens-packages is halted, the packages which follow subsequently come into contact with the lead packages, therein being consolidated into a regularly spaced array. A sensor block is disposed above the conveyor surface 604, at a location upstream from the gate element 610. An additional sensor may be located at a distance wherein a specific number of lens-packages may be aligned therebetween in a staging position 609. For example, the array of lens-packages which is positioned between the wall element 608 and the sensor element 610 in the embodiment illustrated in FIG. 16 is 2×5. Gate element 610 provides for a controlled flow of only the correct number of lens packages necessary to complete the 2×5 array in the staging position.

Figure 17:
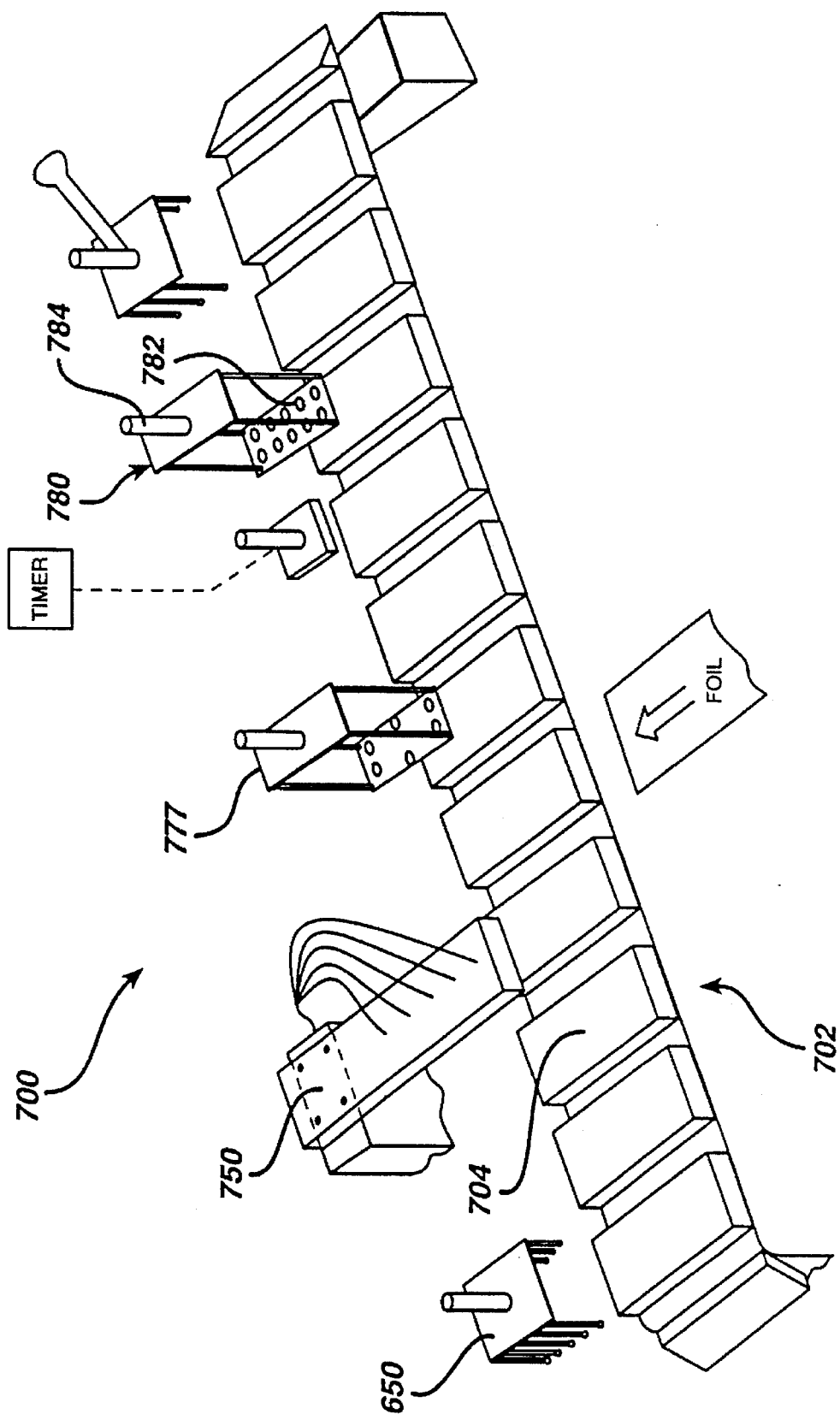
FIG. 17 is a conceptual diagrammatic illustration of the saline solution injector and foil sealing assembly.

Referring now also to FIG. 17, a perspective view of the second rotating lens-package transfer assembly 650 is shown. Once a full 2×5 array of lens-packages are disposed in this staging position 609, a second rotating lens-package transfer assembly 650 lowers a set of suction fingers which remove the array, rotates, and transports the lens-packages to a pallet of the saline solution injector and foil sealing assembly.

More specifically with respect to the second rotating lens-package transfer assembly, the assembly comprises features which are similar in most respects to the first lens-transfer assembly 500. The assembly includes a support 652 which is mounted to the lower end of a rotating shaft 654. The upper end of the shaft 654 is coupled to a rotating means (not shown) which rotates the support through 90 degrees in the horizontal plane. Extending downwardly from the support 652 is an array of regularly spaced fingers 658, the tips 660 of which are hollow so that a vacuum may be drawn therethrough. This vacuum is used to securely hold the lens-package elements during transport. The fingers 658, which are hollow so as to form a conduit through which the vacuum may be drawn, are coupled to tubes 662, at the support 652 for the purposes of supplying the vacuum pressure to the finger tips 660.

The rotating shaft 654 is coupled, through the rotating means, to a mounting platform 651. The mounting platform is, in turn, mounted to a dual axis motive means (track 653 comprises the horizontal axial component along which the mounting platform translates. In operation the assembly is positioned above the consolidating conveyor 602, at the staging position 609, as the array of lens-packages is consolidated. Once the sensor elements have determined that a full 2×5 array of lens-packages has been formed, the manifold 652 and fingers 658 are lowered by the dual axis motive means. A vacuum is drawn in the finger tips 660 once the lens-packages are contacted in order that a secure grip on the lens-packages may be maintained. The manifold 652 and fingers 658 are then raised, rotated, and translated to a position above the pallet stream of the next assembly.

As with the first rotating lens-package transfer assembly 500, the rotating means and the dual axis motive preferably comprise, respectively, an air cylinder with 90 degree stops, and a pair of perpendicular IKO ball screw mechanisms.

THE SALINE SOLUTION INJECTOR AND FOIL SEALING ASSEMBLY

Figure 18:
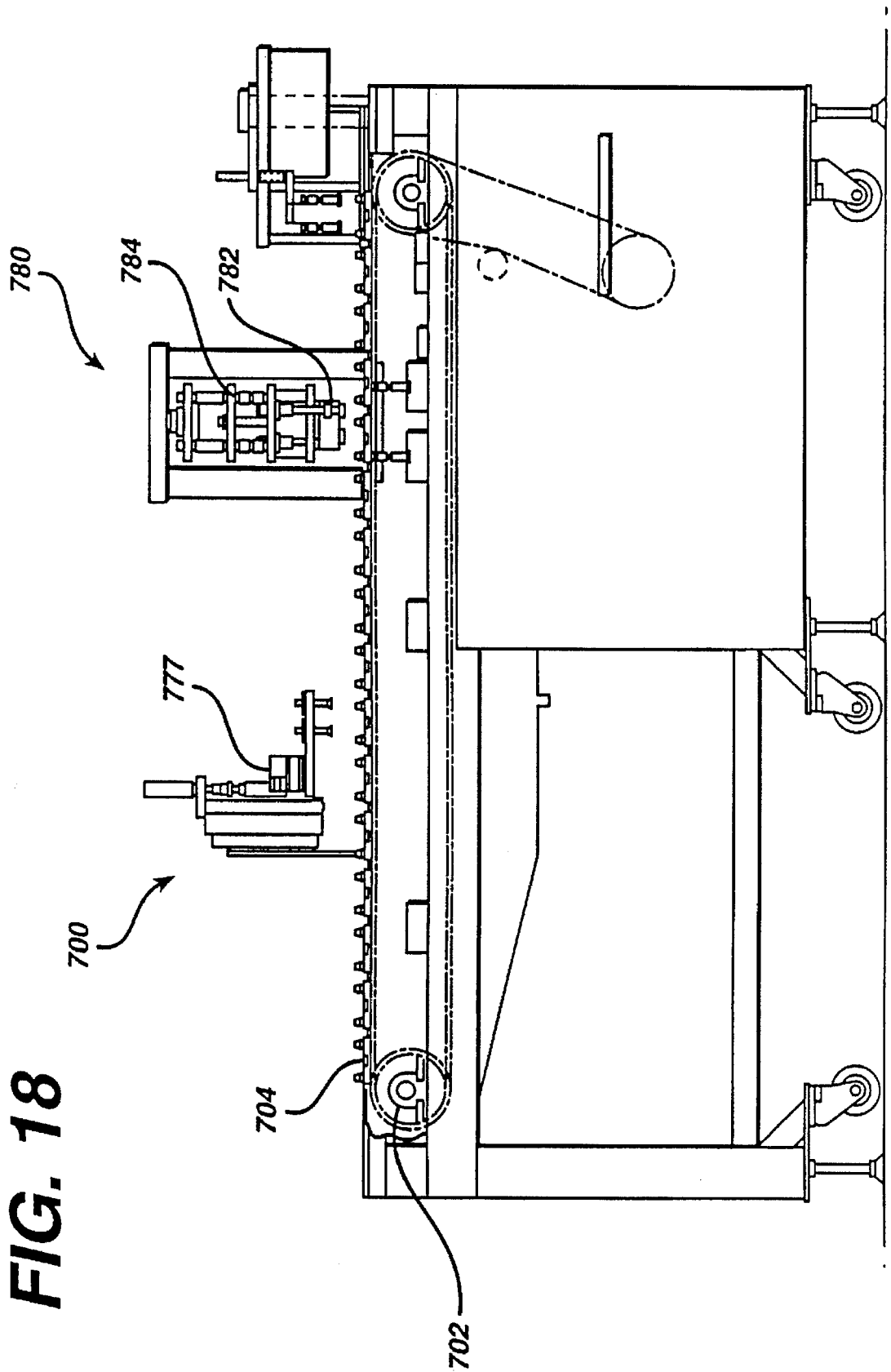
FIG. 18 is a side view of the saline solution injector and foil sealing assembly.

Referring now to FIGS. 18, 19 and 20, various perspective views of the saline solution injector and foil sealing assembly 700 are shown. FIG. 18 is a schematic device layout of the assembly including a conveyor loop 702 having a plurality of pallets 704 spaced therealong. The pallet stream is intermittently driven such that the pallets stop at the various subassembly stations which are sequentially spaced along the conveyor 702.

The related assemblies and subassemblies which cooperate to provide saline and heat sealed covers to previously unsealed lens-packages include the second rotating lens-package transfer assembly 650 disposed at the front of the conveyor 704, the saline injector subassembly 750 positioned adjacent to the front of the conveyor, a short distance downstream from the transfer assembly 650, a foil pick and place unit 777 which receives the foil from a printing machine, and a heat seal unit 780 which seals the foil to the packages.

Each of the fixed pallets 704 is particularly designed to support a 2×5 array of individual lens-packages. It should be appreciated, however, that alternative embodiments of this assembly can be designed, in accordance with the number of fingers of the second lens-package transfer assembly 650, and the size of the staging position 609 of the consolidating conveyor, to accommodate a different number of rows and a different number of packages in each row.

With specific reference to FIG. 20, at the saline solution injector subassembly 750, the lens-packages are filled with a saline solution which has a tonicity compatible with the human eye. Stationary pallets 704 are advanced, with lens-packages thereon, beneath a horizontal beam 752. The beam 752 is coupled at a lateral end to a mounting base 754 which is adjacent to the conveyor loop 702. A 1×5 array of dosing tubes 756 extend downward from the beam 752, and are supplied with saline solution by saline conduits 758, each of which is supplied by a separate dosing pump (not shown).

Upon incremental advance of the pallets 704 into a position aligned with the dosing tubes 754, the dosing pumps are actuated so that a precise dosage of saline solution is deposited into the packaging recesses 24. Each contact lens is thereby completely immersed in saline solution. The rate of pumping of saline solution and the diameter of each dosing tube 756 is chosen such that no saline solution splashes from any of the recesses of the packages, which is very important as any saline solution splashed onto the annular rim 28 would interfere with subsequent foil sealing operations.

The optical verification probes (not shown) may be mounted in front of the saline injector subassembly to verify that lens-packages are present in the advancing pallet 704 so that the dosing tubes 756 do not dispense saline solution into empty pallets. Additional sensors may be similarly mounted along the conveyor, downstream from the saline injector 750, to detect the presence of the proper measured dose of saline solution in each lens-package. A variety of such sensors are available, for example the sensor may be a reflective sensor as is commercially available from Omron, or it could be a proximity sensor or could be a fiber optic probe, as commercially available from Keyence as model 24W-V25R, used with an amplifier, model 24W-AA1C. Each detector checks and verifies for a proper height of saline solution in each lens-package.

Referring again to FIG. 18, and also to FIG. 19, at a subsequent foil pick and place station 775, a pair of strips of laminar foil are placed over the 2×5 array of package bases, each foil strip covering a 1×5 column of packaging elements. The foil strips have printed thereon all identification indicia required for the final package. The laminar top cover sheets are produced by a foil labeling machine pursuant to the disclosure of patent application U.S. Ser. No. 08\106, 386, now abandoned entitled "Double Sided Foil Printing" (VTN-0089) (Attorney Docket 9013). The foil labeling machine extends at a right angle to the linear packaging machine, as indicated by the FOIL arrow in FIG. 18. The pair of foil strips are received from the labeling machine and placed by a foil pick and place unit over the top of each 1×5 row of the 2×5 array of package bases.

An optional mechanical chucking station 777, positions each foil strip to ensure that it is properly positioned and aligned relative to the lens-packages in the pallet 704. In addition, a subsequent cover presence verification station may be used to verify the correct general positioning of each foil strip.

At a subsequent station 780 the foil strips are heat sealed to the lens-packages. More specifically, a set of heated seal heads, mounted at spaced intervals along the length of heating head plate 782, and supported by a pneumatic cylinder or press 784, presses the foil strips against the lens-packages such that the foil and the annular rims 28 of the packaging elements are squeezed between the heated seal heads and the pallet 704.

A final optical inspection station (not shown) may be located downstream of the heat sealing station 780, including a plurality of optical detector probes for examining the outer edges of each sheet of laminated foil strips on the array of lens-packages to ascertain that the foil is properly and precisely positioned and heat sealed relative to the array of lens-packages.

At the position which is farthest downstream, a robotic assembly 790, having a plurality of vacuum suction cups removes the sealed 1×5 array of packages from the pallet 704, and transports them to an output position.

While the several assemblies, embodiments and variations of the present invention for post hydration handling of contact lens-packaging elements are described in detail herein, it should be understood that the disclosure and teachings of the present invention will suggest many alternative designs to those skilled in the art. The scope of the present invention is, therefore, understood and intended to be limited only by the claims recited hereinbelow.

What is claimed is:

1. A post hydration apparatus for transporting, inspecting, and packaging contact lens elements, said apparatus comprising:

a deionized water injection assembly which injects deionized water into a plurality of packaging elements;

a first lens transfer assembly which receives the contact lens elements from a lens pallet at a first location, and deposits them into said packaging elements thereby forming lens-package elements;

an inspection station for optically inspecting the contact lens elements;

a deionized water extraction assembly for removing the deionized water from the lens-package elements;

a first lens-package transport assembly for separating a first set of the lens-package elements which pass inspection from a second set of lens-package elements which do not pass inspection, and transporting the first set of lens-package elements to a packaging station wherein the packaging station further comprises a consolidating conveyor line for receiving the first set of lens-package elements from the first lens-package transport assembly, repositioning the first set of lens-package elements in regular arrays, and transporting the array to said saline solution injector and foil sealing assembly; and a saline solution injector and foil sealing assembly positioned to receive the first set of lens-package elements to inject a quantity of saline solution into the lens-package elements, and to heat seal a foil label to a set of lens-package elements.

2. The apparatus as set forth in claim 1, further comprising a second lens-package transport assembly, which extracts the regular arrays of the first set of lens-package elements from the consolidating line, and transports them to the saline solution injector and foil sealing assembly.

3. The apparatus as set forth in claim 1, further comprising a lens-package conveyor for transporting the second set of lens-package elements to a remote waste collection bin, and wherein said first lens-package transport assembly further transports the second set of lens-package elements to the lens-package conveyor and deposits the second set thereon.

4. A post post-hydration method of transporting, inspecting, and sealing contact lens elements in corresponding packaging elements, comprising the steps of:

injecting deionized water into the packaging elements;

inserting the contact lens elements into said packaging elements, thereby forming a set of lens-package elements;

inspecting the contact lens elements to determine whether the contact lens elements are optically correct or if they are not optically correct;

extracting the deionized water from the lens-package elements;

separating the optically correct contact lens elements from those which are not optically correct;

injecting saline solution into said lens-package elements containing optically correct contact elements;

heat sealing a foil wrapper to the saline solution filled lens-package elements and extracting the contact lens elements from a hydration pallet having a relative spatial distribution before inserting the contact lens elements into said packaging elements, wherein the relative spatial distribution of the contact lens elements is changed before inserting the contact lens elements into said packaging elements; the step of extracting the contact lens elements comprises ejecting a quantity of air from beneath each contact lens element to propel it onto a lens carrying means.

5. The method as set forth in claim 4, further comprising transporting the lens-packages containing set of lens-package elements which contain lenses which are not optically correct to a remote waste collection means.

6. The method as set forth in claim 4, wherein said step of ejecting a quantity of air from beneath each contact lens element is succeeded by a step of directing a jet of air at each contact lens element in order to remove air bubbles which may have adhered to the contact lens elements.

7. A post-hydration apparatus for transporting, inspecting, and sealing contact lens elements in corresponding packaging elements, comprising:

A. a deionized water injection assembly which injects deionized water into the packaging elements;

B. a lens transfer assembly which receives the contact lens elements from a lens pallet at a first location, alters the spatial relationship of the lenses, transports the lenses to a second location, and deposits the lenses into said packaging elements thereby forming a set of lens-package elements, said lens transfer assembly comprising;

1. a set of horizontal guide rails;
2. a plurality of beam elements, slidably mounted in parallel on at least one of said of horizontal guide rails;
3. a reciprocating means coupled to said beam elements for reciprocating same along said guide rails with respect to one another;
4. a plurality of finger elements disposed in a linear array, extending downwardly from at least one of said beam elements, each of said finger elements comprising:
    a. a mounting bracket,
    b. an elongate shaft, having an upper and lower end,
    c. a lens transfer surface at the lower end of the shaft for receiving, and securely holding, thereon at least one of said contact lens elements,
    d. a slotted annular skirt disposed along the shaft adjacent to said lens transfer surface, for maintaining the contact lens at a predetermined position; and
    e. a translation mechanism for reciprocating said mounting bracket in at least one direction;

C. a deionized water extraction assembly for removing the deionized water from the lens-package elements;

D. a lens-package transport assembly for transporting the lens-package elements to a packaging station; and E. a saline solution injector and foil sealing assembly positioned to receive the lens-package elements and to inject therein a quantity of saline solution, and to heat seal a foil label to a top surface of the lens-package elements.

8. The apparatus as set forth in claim 7, wherein said finger elements further comprise a central bore, extending from said upper end to said lower end, for receiving therethrough, and selectively ejecting therefrom, a quantity of fluid.

9. The apparatus as set forth in claim 7, wherein said lens pallets comprises:

a plate having a plurality of recesses, each of said recesses having at least one hole therein, in which recesses a contact lens may be disposed; and a plurality of internal conduits within said plate, extending from each of said holes to a fluid source, whereby selective ejection of fluid through the conduits causes a contact lens in said recess to be transferred to said lens transfer assembly.

10. The apparatus as set forth in claim 7, further comprising an air jet unit positioned at said second location, said air jet unit comprising:

a plate having a plurality of a regularly spaced recesses therein, said regular spaced recesses corresponding to a spatial distribution of said finger elements;

at least one hole in each of said recesses;

a conduit extending from a remote air reservoir to said hole in each of said recesses;

an air pressure means for selectively directing air through said conduit, out of said hole, and at a contact lens which is secured to the lens transfer surface of said finger elements for removal of any bubbles present thereon.

* * * * *